(12) United States Patent
Aumiller et al.

(10) Patent No.: US 12,598,403 B2
(45) Date of Patent: Apr. 7, 2026

(54) HYBRID IMAGE AND EVENT SENSING WITH ROLLING SHUTTER COMPENSATION

(71) Applicant: Sony Semiconductor Solutions Corporation, Kanagawa (JP)

(72) Inventors: Andreas Aumiller, Stuttgart (DE); Yupeng Zhao, Stuttgart (DE); Kensei Jo, Stuttgart (DE)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 35 days.

(21) Appl. No.: 18/845,628

(22) PCT Filed: Feb. 22, 2023

(86) PCT No.: PCT/EP2023/054438
§ 371 (c)(1),
(2) Date: Sep. 10, 2024

(87) PCT Pub. No.: WO2023/174653
PCT Pub. Date: Sep. 21, 2023

(65) Prior Publication Data
US 2025/0211873 A1    Jun. 26, 2025

(30) Foreign Application Priority Data
Mar. 17, 2022    (EP) .................................... 22162710

(51) Int. Cl.
| | |
|---|---|
| *H04N 25/707* | (2023.01) |
| *H04N 25/47* | (2023.01) |
| *H04N 25/531* | (2023.01) |
| *H04N 25/78* | (2023.01) |
| *H04N 25/79* | (2023.01) |

(52) U.S. Cl.
CPC ........... *H04N 25/707* (2023.01); *H04N 25/47* (2023.01); *H04N 25/531* (2023.01); *H04N 25/78* (2023.01); *H04N 25/79* (2023.01)

(58) Field of Classification Search
CPC .... H04N 25/707; H04N 25/47; H04N 25/531; H04N 25/78; H04N 25/79
(Continued)

(56) References Cited

U.S. PATENT DOCUMENTS

| | | |
|---|---|---|
| 2019/0098217 A1 | 3/2019 | Zhou et al. |
| 2020/0226377 A1 | 7/2020 | Campos Macias et al. |

(Continued)

FOREIGN PATENT DOCUMENTS

| | | |
|---|---|---|
| EP | 3929864 A1 | 12/2021 |
| WO | 2014/043367 A1 | 3/2014 |
| WO | 2020/069034 A1 | 4/2020 |

OTHER PUBLICATIONS

International Search Report and Written Opinion mailed on Apr. 12, 2023, received for International Application No. PCT/EP2023/054438, filed on Feb. 22, 2023, 12 pages.
(Continued)

*Primary Examiner* — Joel W Fosselman
(74) *Attorney, Agent, or Firm* — XSENSUS LLP

(57) ABSTRACT

A sensor device includes multiple pixels that receive light and perform photoelectric conversion to generate electrical signals. It has event detection circuitry that detects intensity changes above a threshold in a subset of pixels (event-detecting pixels) and generates event data. Another subset of pixels (intensity-detecting pixels) arranged in a two-dimensional array generates signals representing light intensity. A control unit associates event-detecting and intensity-detecting pixels based on their field of view and assigns corresponding pixel row numbers. It applies a rolling shutter to (Continued)

read pixel signals and assigns time stamps indicating the readout time. The control unit converts pixel and event time stamps to a unified frame time using a conversion function dependent on the pixel row number.

12 Claims, 22 Drawing Sheets

(58) Field of Classification Search
USPC ........................................................ 348/296
See application file for complete search history.

(56)                     References Cited

U.S. PATENT DOCUMENTS

2020/0358977 A1    11/2020  Niwa et al.
2021/0041570 A1     2/2021  Pacala
2021/0075964 A1     3/2021  Sapienza et al.
2023/0008550 A1*    1/2023  Bock ...................... H04N 25/47

OTHER PUBLICATIONS

Brandli et al., "A 240×180 130 dB 3 μs Latency Global Shutter Spatiotemporal Vision Sensor", IEEE Journal of Solid-State Circuits, vol. 49, No. 10, Oct. 2014, pp. 2333-2341.
Li et al., "Design of an RGBW Color VGA Rolling and Global Shutter Dynamic and Active-Pixel Vision Sensor", May 24, 2015, pp. 718-721.
Tourani et al., "Rolling Shutter and Motion Blur Removal for Depth Cameras", 2016 IEEE International Conference on Robotics and Automation (ICRA), May 16-21, 2016, pp. 5098-5105.

* cited by examiner

Fig. 15A
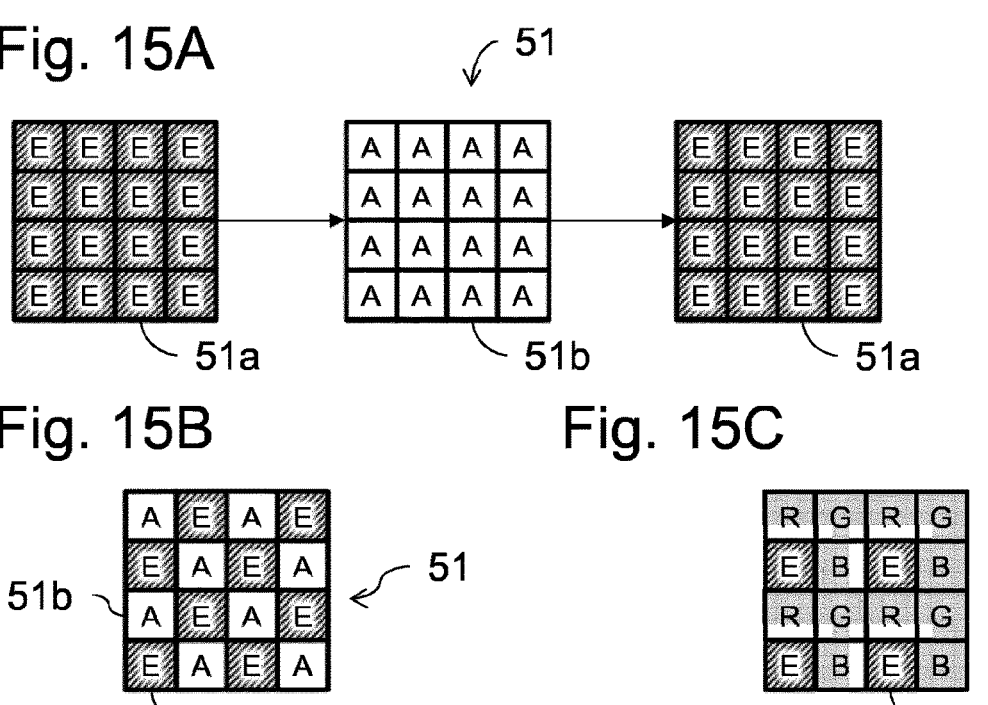
Fig. 15B                    Fig. 15C
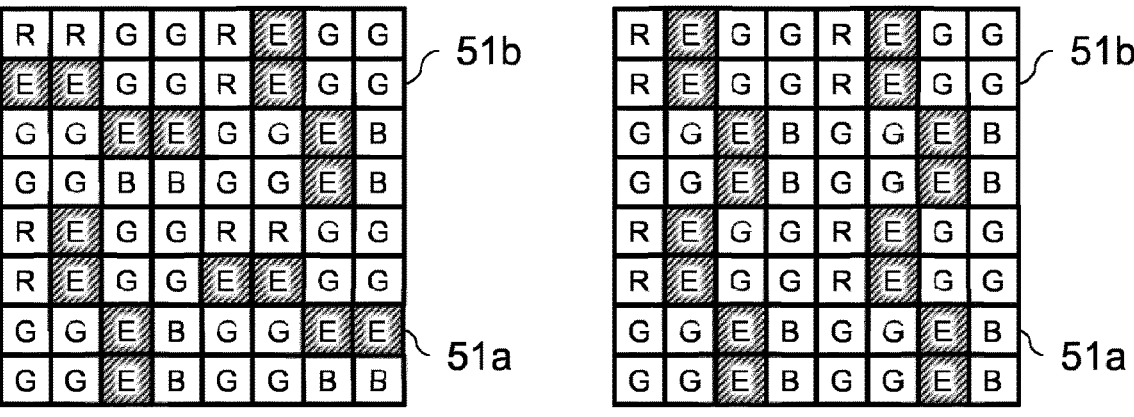
Fig. 15D
Fig. 15E
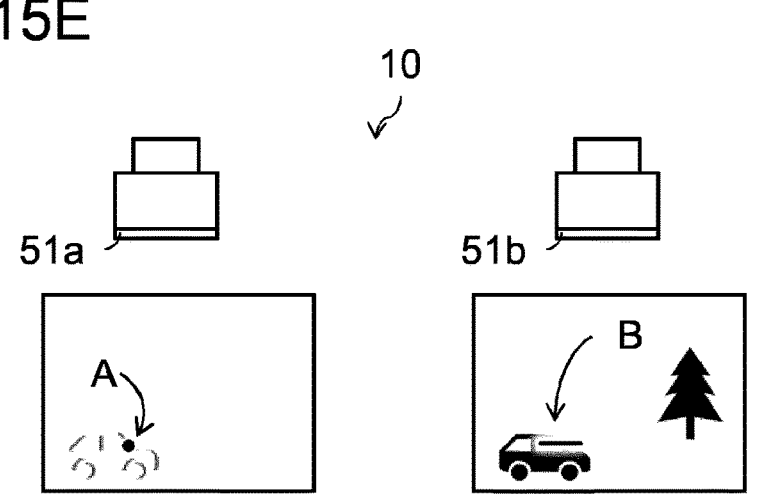

Fig. 16
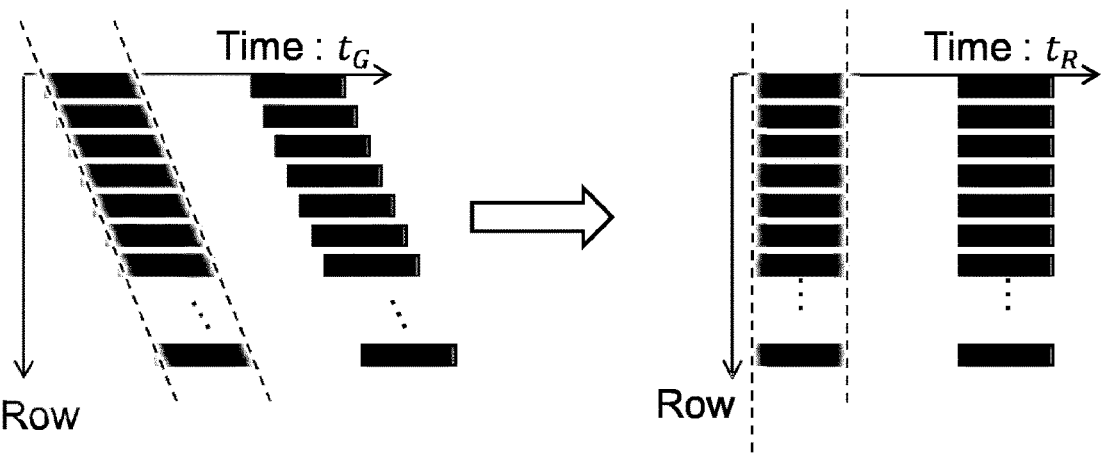
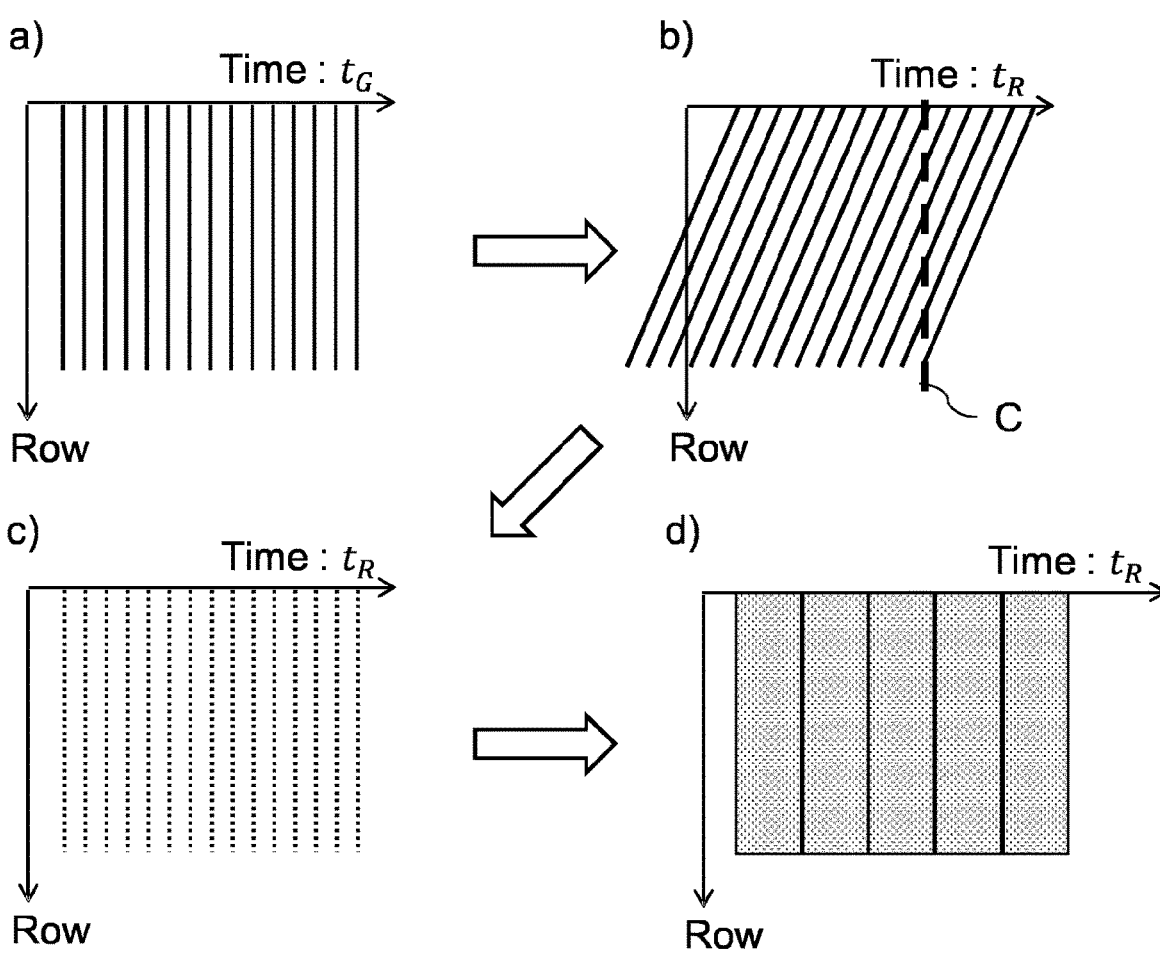

Fig. 19
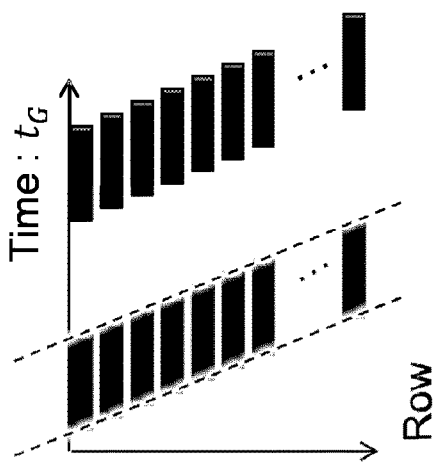
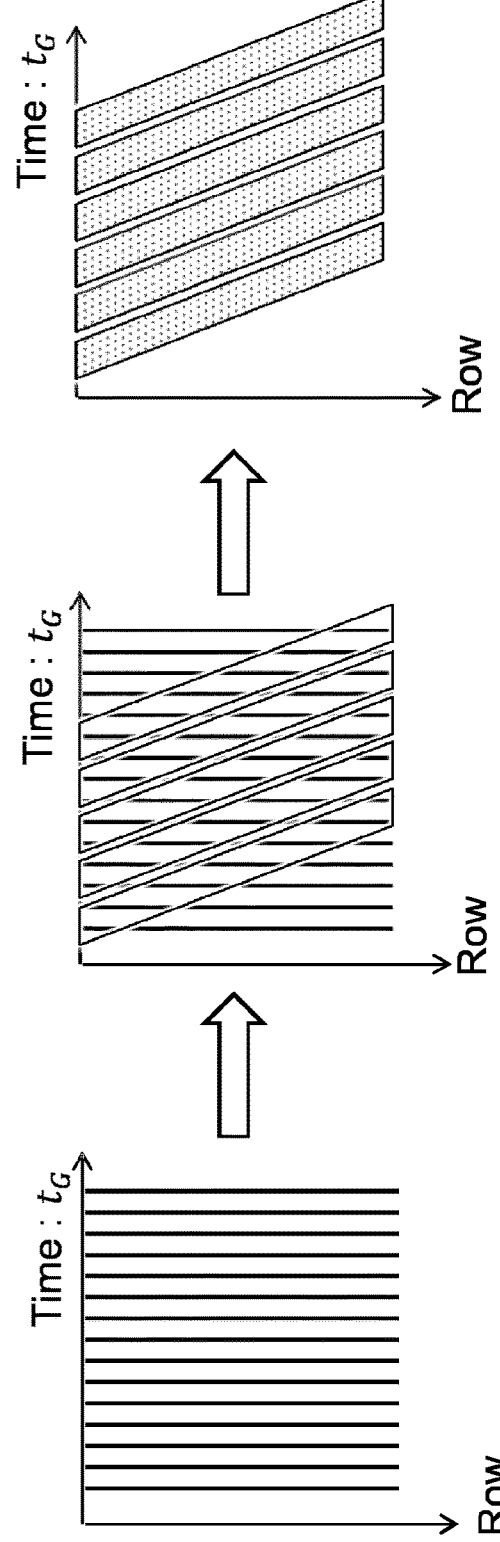

Fig. 20

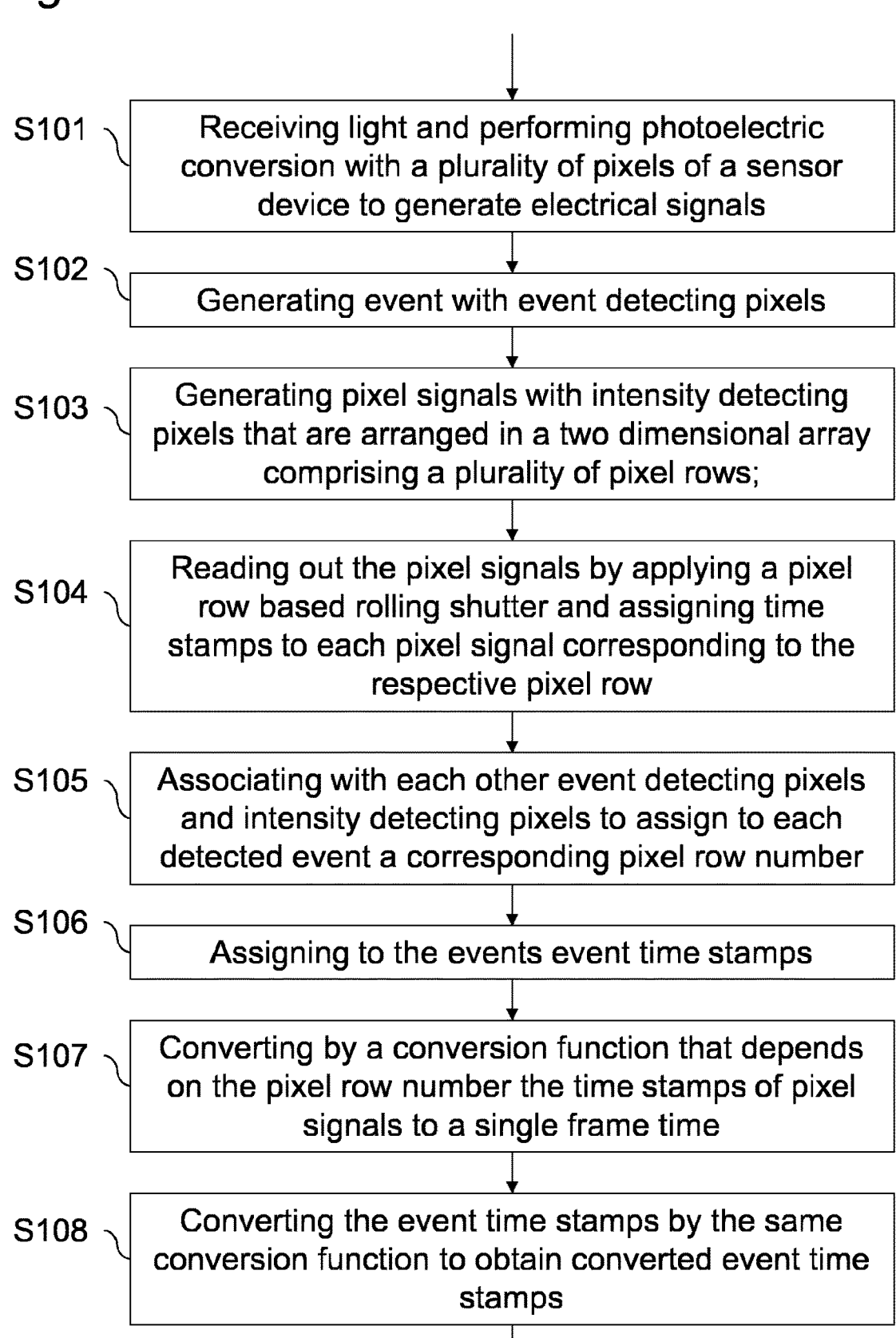

S101 — Receiving light and performing photoelectric conversion with a plurality of pixels of a sensor device to generate electrical signals S102 — Generating event with event detecting pixels S103 — Generating pixel signals with intensity detecting pixels that are arranged in a two dimensional array comprising a plurality of pixel rows;

S104 — Reading out the pixel signals by applying a pixel row based rolling shutter and assigning time stamps to each pixel signal corresponding to the respective pixel row S105 — Associating with each other event detecting pixels and intensity detecting pixels to assign to each detected event a corresponding pixel row number S106 — Assigning to the events event time stamps S107 — Converting by a conversion function that depends on the pixel row number the time stamps of pixel signals to a single frame time S108 — Converting the event time stamps by the same conversion function to obtain converted event time stamps

HYBRID IMAGE AND EVENT SENSING WITH ROLLING SHUTTER COMPENSATION

CROSS-REFERENCE TO RELATED APPLICATIONS

The present application is a national stage application, pursuant to 35 U.S.C. § 371, of International Patent Application No. PCT/EP2023/054438, filed Feb. 22, 2023, which claims priority from European Patent Application No. 22162710.2, filed Mar. 17, 2022, the entire contents of each are incorporated herein by reference.

FIELD OF THE INVENTION

The present technology relates to a sensor device and a method for operating a sensor device, in particular, to a sensor device and a method for operating a sensor device that allows temporal alignment of image frames captured with a rolling shutter and of concurrently generated event data.

BACKGROUND

EVS (event-based vision sensor), DVS (dynamic vision sensor) or event cameras respond to brightness changes in each pixel by determining whether a change of received intensity is above a predetermined threshold. These devices can capture object having a high speed, have a high dynamic range, and use less data compared with conventional image sensors.

On the other hand conventional image sensors, often referred to as APSs (Active Pixel Sensors), allow reconstructing images that are more appealing to the human eye by providing e.g. color information.

In order to synthesize the advantages of both sensor types hybrid sensors have been proposed that allow capturing of both intensity and event information with a single sensor. For example a DAVIS (Dynamic and Active-pixel Vision Sensor) works as both APS and EVS with a shared circuit, such that all pixels can capture intensity and events simultaneously. Moreover, it is also possible to use temporal multiplexing to change the operation mode of a single pixel between intensity and event detection or to provide dedicated EVS and APS pixels at different locations.

In order to benefit from the concurrent capturing of event and intensity data it is necessary to temporally align or register the captured events with the captured intensity images. Only by such registering it will be possible to extract full information from the available data, e.g. by a neuronal network.

However, temporal registering may be difficult if a rolling shutter is used, if compared to global shutter solutions as used e.g. in a DAVIS, since then capture times of pixels will depend on the position of the pixels in the image. Furthermore, it is unclear how to treat the different types of event acquisition in this regard. An address-based EVS will asynchronously output information on pixel position, time stamp and polarity only for the pixel receiving the changed intensity. Thus, there will be a large number of events having differing time stamps. Frame-based EVS detects changes in all pixels and outputs them as a frame, however, according to a global shutter concept, i.e. all pixels at once. Applying here rolling shutter concepts, too, will further complicate the situation, in particular since time constants of APS rolling shutters and EVS rolling shutters will differ due to the different temporal resolutions.

Thus, if the APS has a rolling shutter, temporal registration will be difficult due to the dependency of the acquisition time on the pixel position. Further, while this problem is most sever in hybrid sensors it also appears in multi camera system having an APS camera and an EVS camera.

It is therefore desirable to improve the temporal registration between pixel signals obtained by an APS and events detected by an EVS/DVS.

SUMMARY OF INVENTION

To this end, a sensor device is provided that comprises a plurality of pixels each configured to receive light and perform photoelectric conversion to generate an electrical signal, event detection circuitry that is configured to generate event data by detecting as events intensity changes above a predetermined threshold of the light received by each of event detecting pixels that form a first subset of the pixels, pixel signal generating circuitry that is configured to generate pixel signals indicating intensity values of the light received by each of intensity detecting pixels that form a second subset of the pixels, the intensity detecting pixels being arranged in a two dimensional array comprising a plurality of pixel rows, and a control unit. Here the control unit is configured to associate with each other event detecting pixels and intensity detecting pixels that have a corresponding field of view in order to assign to each detected event a corresponding pixel row number, to read out the pixel signals by applying a rolling shutter that starts readout of the pixel signals of adjacent pixel rows at times separated by a predetermined time period and to assign time stamps to each pixel signal that indicate the time of readout of the corresponding pixel row, to assign to the events event time stamps based on the time at which the events were detected, to convert by a conversion function that depends on the pixel row number the time stamps of all pixel signals to a single frame time, where the pixel signals were obtained during an intensity frame acquisition period that is defined as the time required for a single readout of all pixel rows, and to convert the event time stamps by the same conversion function to obtain converted event time stamps for detected events.

Further a method for operating a sensor device is provided, the method comprising: receiving light and performing photoelectric conversion with a plurality of pixels of the sensor device to generate an electrical signal; generating, by event detection circuitry of the sensor device, event data by detecting as events intensity changes above a predetermined threshold of the light received by each of event detecting pixels that form a first subset of the pixels; generating, by signal generating circuitry, pixel signals indicating intensity values of the light received by each of intensity detecting pixels that form a second subset of the pixels, the intensity detecting pixels being arranged in a two dimensional array comprising a plurality of pixel rows; reading out the pixel signals by applying a rolling shutter that starts readout of the pixel signals of adjacent pixel rows at times separated by a predetermined time period and assigning time stamps to each pixel signal that indicate the time of readout of the corresponding pixel row; associating with each other event detecting pixels and intensity detecting pixels that have a corresponding field of view in order to assign to each detected event a corresponding pixel row number; assigning to the events event time stamps based on the time at which the events were detected; converting by a conversion function that depends on the pixel row number the time stamps of all pixel signals to a single frame time, where the pixel signals were obtained during an intensity frame acquisition period that is defined as the time required for a single readout of all pixel rows; and converting the event time stamps by the same conversion function to obtain converted event time stamps for detected events.

Thus, a two stage registration process is performed. First, the pixel signals obtained with an APS having a rolling shutter are time converted such as to assign a single frame time to all pixel signals. To this end, a conversion function is used that depends on the row number such as to bring the different time stamps of the pixel signals in different rows to the single frame time. Accordingly, a time representation of the pixel signals is achieved that corresponds to the time representation of a global shutter frame, i.e. all pixels/pixel signals have the same time stamp. In this manner the data obtained by the rolling shutter APS can be processed with the techniques available for global shutter frames, which needs typically less computing power since it is not necessary to take into account different times for different pixel signals.

Second, also the event time stamps of the various events are converted with the same conversion function, i.e. in a row dependent manner. This guarantees that time stamps of event data and pixel signals that were generated at the same time in the same row will have identical time stamps after conversion. The row number for each event can either be determined from the relative spatial arrangement of the event detecting pixels and the intensity signal generating pixels or from the information captured by the pixels.

In this manner it is possible to use the advantages of rolling shutter image acquisition in combination with an EVS, while ensuring that the respective data are temporally aligned such as to allow further processing with the computational simpler methods available for global shutter data.

BRIEF DESCRIPTION OF DRAWINGS

FIGS. 15A to 15E are schematic block diagrams showing distributions of pixels with different functions.

FIG. 16 illustrates schematically functions of a sensor device.

FIG. 19 illustrates schematically generation of a voxel grid.

FIG. 20 illustrates schematically a process flow of a method for operating a sensor device

DETAILED DESCRIPTION

The present disclosure is directed to mitigating problems of time registering signals in sensors with mixed APS and EVS pixels. In particular, the problem is addressed how to temporally align APS pixel signals captured with a rolling shutter with events that were concurrently detected by EVS pixels. The solutions to this problem discussed below are applicable to all according sensor types. However, in order to ease the description and also in order to cover an important application example, the present description is focused without prejudice on hybrid sensors that combine an active pixel sensor with an DVS/EVS.

First, a possible implementation of a hybrid APS+DVS/EVS will be described. This is of course purely exemplary. It is to be understood that the hybrid sensor could also be implemented differently.

Figure 1:
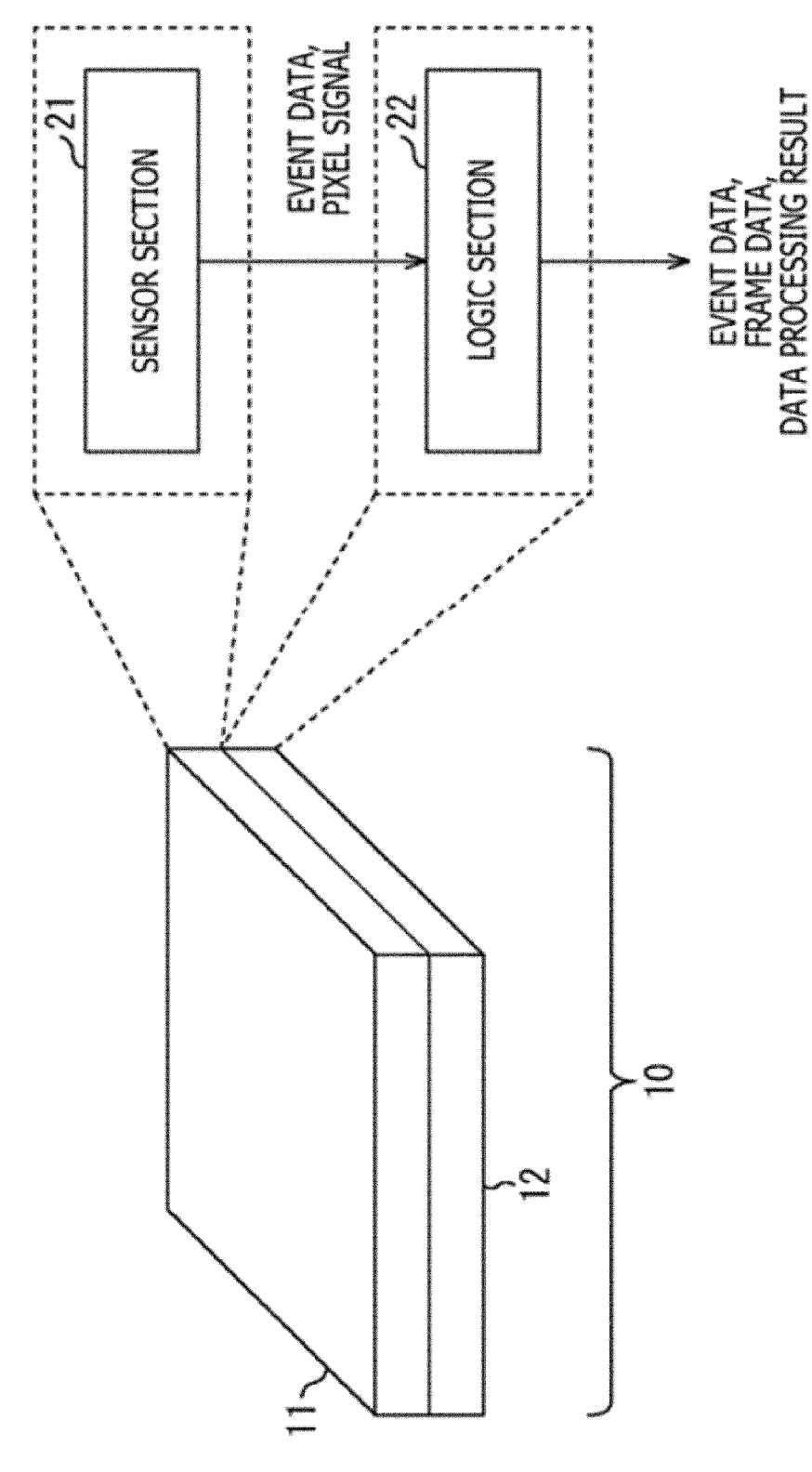
FIG. 1 is a schematic diagram of a sensor device.

FIG. 1 is a diagram illustrating a configuration example of a sensor device 10, which is in the example of FIG. 1 constituted by a sensor chip.

The sensor device 10 is a single-chip semiconductor chip and includes a sensor die (substrate) 11, which serves as a plurality of dies (substrates), and a logic die 12 that are stacked. Note that, the sensor device 10 can also include only a single die or three or more stacked dies.

In the sensor device 10 of FIG. 1, the sensor die 11 includes (a circuit serving as) a sensor section 21, and the logic die 12 includes a logic section 22. Note that, the sensor section 21 can be partly formed on the logic die 12. Further, the logic section 22 can be partly formed on the sensor die 11.

The sensor section 21 includes pixels configured to perform photoelectric conversion on incident light to generate electrical signals, and generates event data indicating the occurrence of events that are changes in the electrical signal of the pixels. The sensor section 21 supplies the event data to the logic section 22. That is, the sensor section 21 performs imaging of performing, in the pixels, photoelectric conversion on incident light to generate electrical signals, similarly to a synchronous image sensor, for example. The sensor section 21, however, generates event data indicating the occurrence of events that are changes in the electrical signal of the pixels instead of generating image data in a frame format (frame data). The sensor section 21 outputs, to the logic section 22, the event data obtained by the imaging.

Here, the synchronous image sensor is an image sensor configured to perform imaging in synchronization with a vertical synchronization signal and output frame data that is image data in a frame format. The sensor section 21 can be regarded as asynchronous (an asynchronous image sensor) in contrast to the synchronous image sensor, since the sensor section 21 does not operate in synchronization with a vertical synchronization signal when outputting event data.

Note that, the sensor section 21 can generate and output, other than event data, frame data, similarly to the synchronous image sensor. In addition, the sensor section 21 can output, together with event data, electrical signals of pixels in which events have occurred, as pixel signals that are pixel values of the pixels in frame data.

The logic section 22 controls the sensor section 21 as needed. Further, the logic section 22 performs various types of data processing, such as data processing of generating frame data on the basis of event data from the sensor section 21 and image processing on frame data from the sensor section 21 or frame data generated on the basis of the event data from the sensor section 21, and outputs data processing results obtained by performing the various types of data processing on the event data and the frame data.

Figure 2:
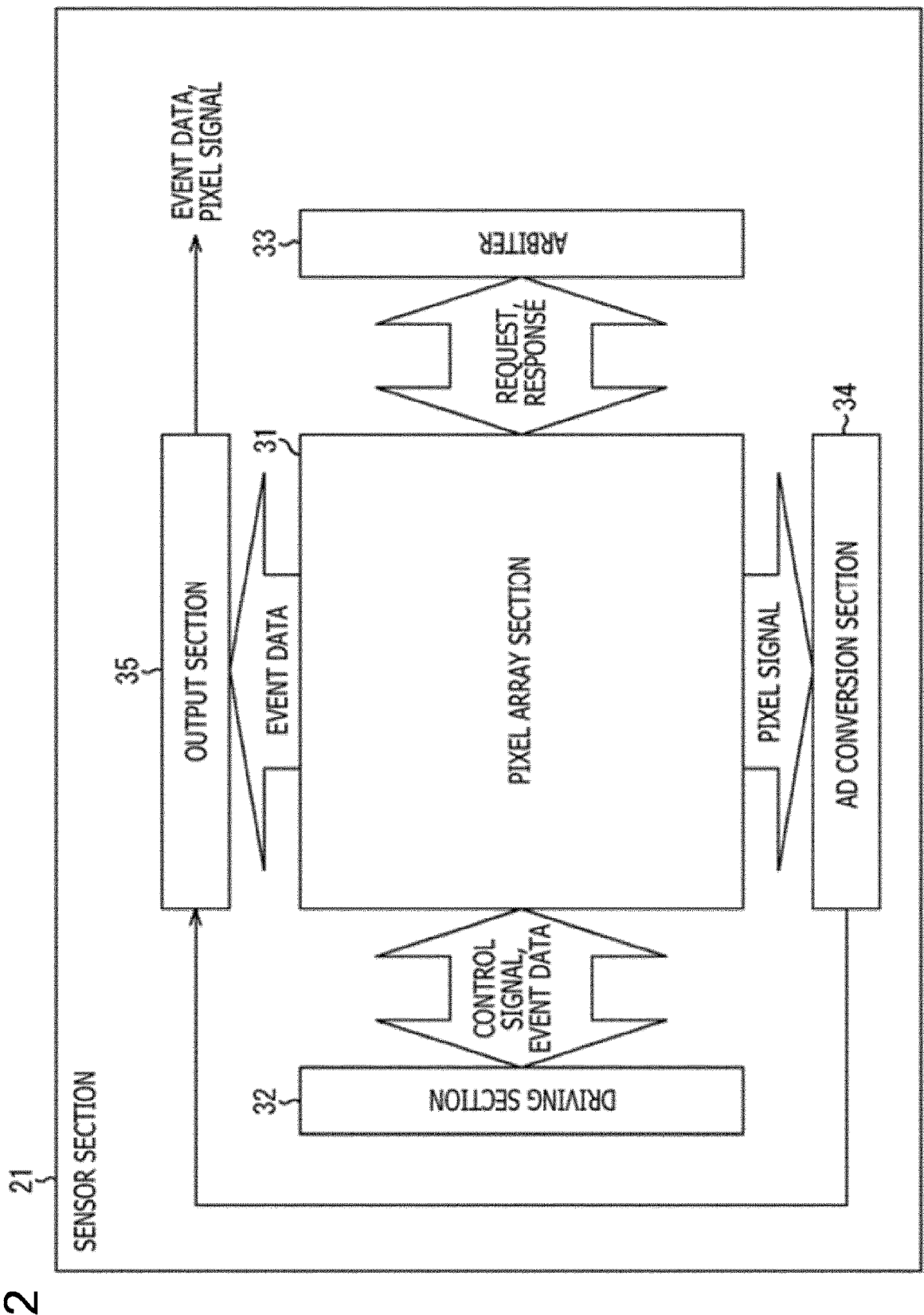
FIG. 2 is a schematic block diagram of a sensor section.

FIG. 2 is a block diagram illustrating a configuration example of the sensor section 21 of FIG. 1.

The sensor section 21 includes a pixel array section 31, a driving section 32, an arbiter 33, an AD (Analog to Digital) conversion section 34, and an output section 35.

The pixel array section 31 includes a plurality of pixels 51 (FIG. 3) arrayed in a two-dimensional lattice pattern. The pixel array section 31 detects, in a case where a change larger than a predetermined threshold (including a change equal to or larger than the threshold as needed) has occurred in (a voltage corresponding to) a photocurrent that is an electrical signal generated by photoelectric conversion in the pixel 51, the change in the photocurrent as an event. In a case of detecting an event, the pixel array section 31 outputs, to the arbiter 33, a request for requesting the output of event data indicating the occurrence of the event. Then, in a case of receiving a response indicating event data output permission from the arbiter 33, the pixel array section 31 outputs the event data to the driving section 32 and the output section 35. In addition, the pixel array section 31 may output an electrical signal of the pixel 51 in which the event has been detected to the AD conversion section 34, as a pixel signal. Preferably, the pixel array section 31 may output pixel signals based on a rolling shutter approach.

The driving section 32 supplies control signals to the pixel array section 31 to drive the pixel array section 31. For example, the driving section 32 drives the pixel 51 regarding which the pixel array section 31 has output event data, so that the pixel 51 in question supplies (outputs) a pixel signal to the AD conversion section 34. However, preferably the driving section 32 drives the pixels 51 by applying a rolling shutter that starts readout of the pixel signals of adjacent pixel rows at times separated by a predetermined time period.

The arbiter 33 arbitrates the requests for requesting the output of event data from the pixel array section 31, and returns responses indicating event data output permission or prohibition to the pixel array section 31.

The AD conversion section 34 includes, for example, a single-slope ADC (AD converter) (not illustrated) in each column of pixel blocks 41 (FIG. 3) described later, for example. The AD conversion section 34 performs, with the ADC in each column, AD conversion on pixel signals of the pixels 51 of the pixel blocks 41 in the column, and supplies the resultant to the output section 35. Note that, the AD conversion section 34 can perform CDS (Correlated Double Sampling) together with pixel signal AD conversion.

The output section 35 performs necessary processing on the pixel signals from the AD conversion section 34 and the event data from the pixel array section 31 and supplies the resultant to the logic section 22 (FIG. 1).

Here, a change in the photocurrent generated in the pixel 51 can be recognized as a change in the amount of light entering the pixel 51, so that it can also be said that an event is a change in light amount (a change in light amount larger than the threshold) in the pixel 51.

Event data indicating the occurrence of an event at least includes location information (coordinates or the like) indicating the location of a pixel block in which a change in light amount, which is the event, has occurred. Besides, the event data can also include the polarity (positive or negative) of the change in light amount.

With regard to the series of event data that is output from the pixel array section 31 at timings at which events have occurred, it can be said that, as long as the event data interval is the same as the event occurrence interval, the event data implicitly includes time point information indicating (relative) time points at which the events have occurred. However, for example, when the event data is stored in a memory and the event data interval is no longer the same as the event occurrence interval, the time point information implicitly included in the event data is lost. Thus, the output section 35 includes, in event data, time point information indicating (relative) time points at which events have occurred, such as timestamps, before the event data interval is changed from the event occurrence interval. The processing of including time point information in event data can be performed in any block other than the output section 35 as long as the processing is performed before time point information implicitly included in event data is lost. Further, events may be read out at predetermined time points such as to generate the event data in a frame-like fashion.

Figure 3:
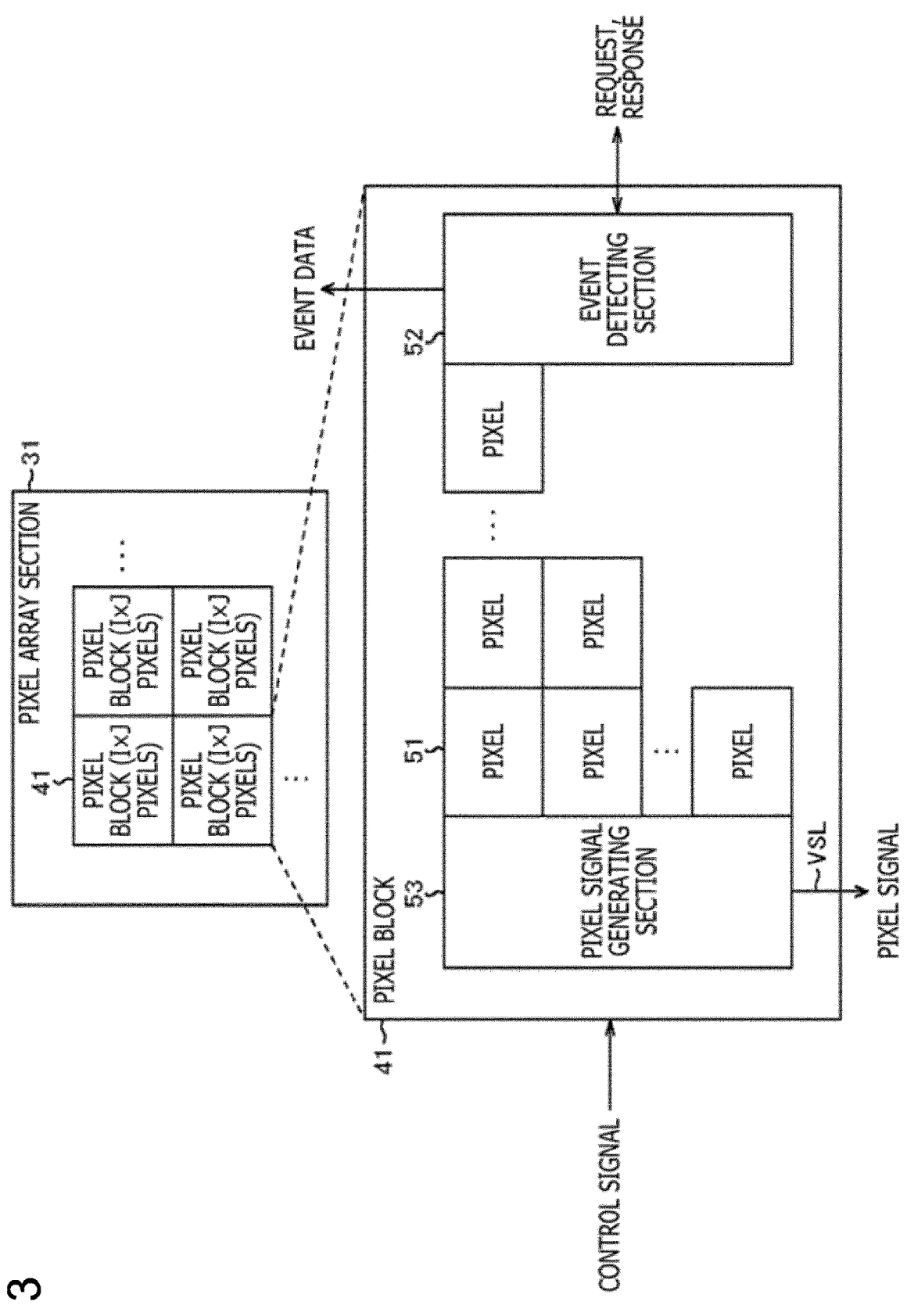
FIG. 3 is a schematic block diagram of a pixel array section.

FIG. 3 is a block diagram illustrating a configuration example of the pixel array section 31 of FIG. 2.

The pixel array section 31 includes the plurality of pixel blocks 41. The pixel block 41 includes the I×J pixels 51 that are one or more pixels arrayed in I rows and J columns (I and J are integers), an event detecting section 52, and a pixel signal generating section 53. The one or more pixels 51 in the pixel block 41 share the event detecting section 52 and the pixel signal generating section 53. Further, in each column of the pixel blocks 41, a VSL (Vertical Signal Line) for connecting the pixel blocks 41 to the ADC of the AD conversion section 34 is wired.

The pixel 51 receives light incident from an object and performs photoelectric conversion to generate a photocurrent serving as an electrical signal. The pixel 51 supplies the photocurrent to the event detecting section 52 under the control of the driving section 32.

The event detecting section 52 detects, as an event, a change larger than the predetermined threshold in photocurrent from each of the pixels 51, under the control of the driving section 32. In a case of detecting an event, the event detecting section 52 supplies, to the arbiter 33 (FIG. 2), a request for requesting the output of event data indicating the occurrence of the event. Then, when receiving a response indicating event data output permission to the request from the arbiter 33, the event detecting section 52 outputs the event data to the driving section 32 and the output section 35.

The pixel signal generating section 53 may generate, in the case where the event detecting section 52 has detected an event, a voltage corresponding to a photocurrent from the pixel 51 as a pixel signal, and supplies the voltage to the AD conversion section 34 through the VSL, under the control of the driving section 32. The pixel signal generating section 53 may generate pixel signals also based on various other triggers, e.g. based on a temporally shifted selection of readout rows, i.e. by applying a rolling shutter.

Here, detecting a change larger than the predetermined threshold in photocurrent as an event can also be recognized as detecting, as an event, absence of change larger than the predetermined threshold in photocurrent. The pixel signal generating section 53 can generate a pixel signal in the case where absence of change larger than the predetermined threshold in photocurrent has been detected as an event as well as in the case where a change larger than the predetermined threshold in photocurrent has been detected as an event.

Figure 4:
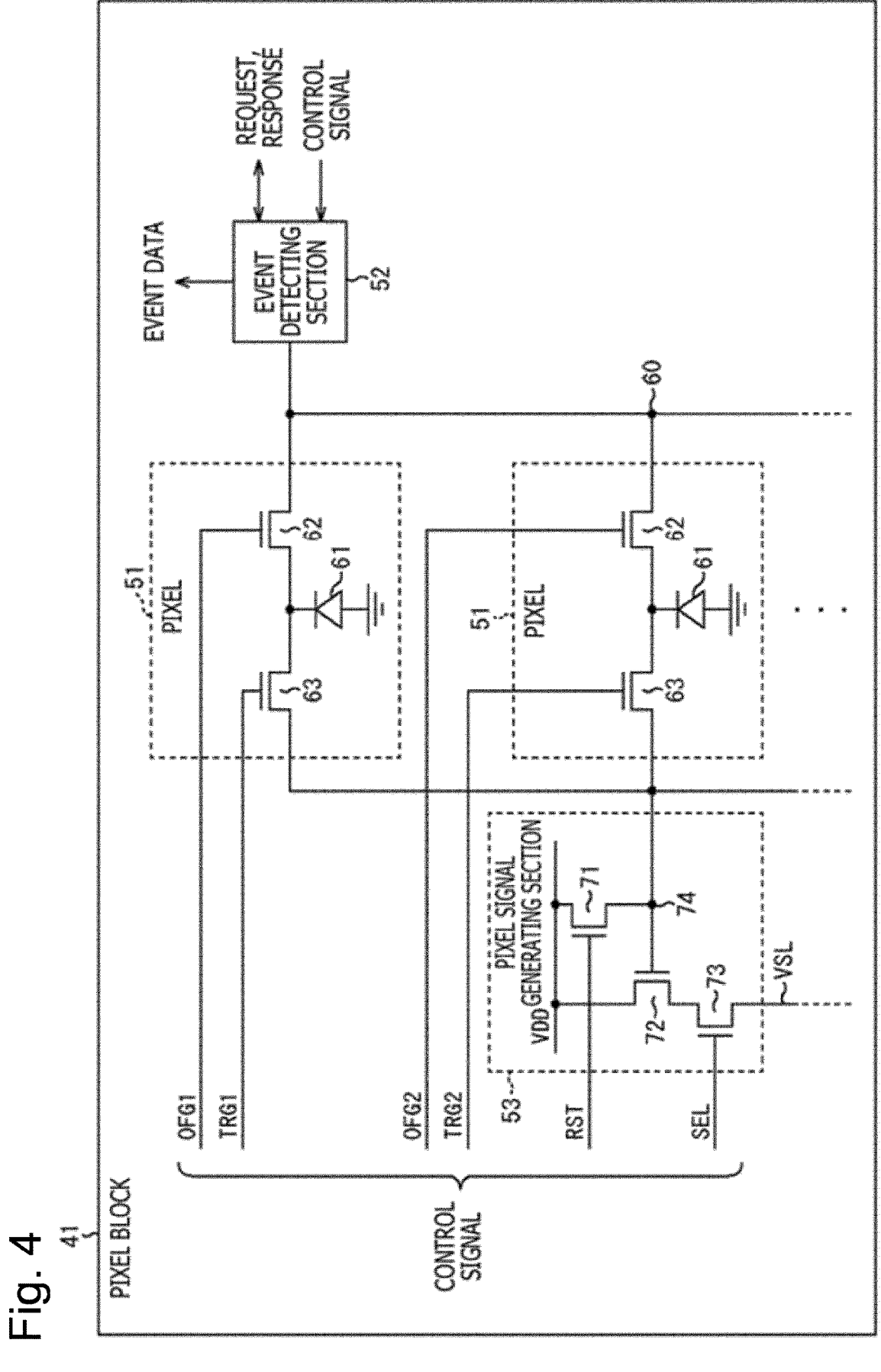
FIG. 4 is a schematic circuit diagram of a pixel block.

FIG. 4 is a circuit diagram illustrating a configuration example of the pixel block 41.

The pixel block 41 includes, as described with reference to FIG. 3, the pixels 51, the event detecting section 52, and the pixel signal generating section 53.

The pixel 51 includes a photoelectric conversion element 61 and transfer transistors 62 and 63.

The photoelectric conversion element 61 includes, for example, a PD (Photodiode). The photoelectric conversion element 61 receives incident light and performs photoelectric conversion to generate charges.

The transfer transistor 62 includes, for example, an N (Negative)-type MOS (Metal-Oxide-Semiconductor) FET (Field Effect Transistor). The transfer transistor 62 of the n-th pixel 51 of the I×J pixels 51 in the pixel block 41 is turned on or off in response to a control signal OFGn supplied from the driving section 32 (FIG. 2). When the transfer transistor 62 is turned on, charges generated in the photoelectric conversion element 61 are transferred (supplied) to the event detecting section 52, as a photocurrent.

The transfer transistor 63 includes, for example, an N-type MOSFET. The transfer transistor 63 of the n-th pixel 51 of the I×J pixels 51 in the pixel block 41 is turned on or off in response to a control signal TRGn supplied from the driving section 32. When the transfer transistor 63 is turned on, charges generated in the photoelectric conversion element 61 are transferred to an FD 74 of the pixel signal generating section 53.

The I×J pixels 51 in the pixel block 41 are connected to the event detecting section 52 of the pixel block 41 through nodes 60. Thus, photocurrents generated in (the photoelectric conversion elements 61 of) the pixels 51 are supplied to the event detecting section 52 through the nodes 60. As a result, the event detecting section 52 receives the sum of photocurrents from all the pixels 51 in the pixel block 41. Thus, the event detecting section 52 detects, as an event, a change in sum of photocurrents supplied from the I×J pixels 51 in the pixel block 41.

The pixel signal generating section 53 includes a reset transistor 71, an amplification transistor 72, a selection transistor 73, and the FD (Floating Diffusion) 74.

The reset transistor 71, the amplification transistor 72, and the selection transistor 73 include, for example, N-type MOSFETs.

The reset transistor 71 is turned on or off in response to a control signal RST supplied from the driving section 32 (FIG. 2). When the reset transistor 71 is turned on, the FD 74 is connected to a power supply VDD, and charges accumulated in the FD 74 are thus discharged to the power supply VDD. With this, the FD 74 is reset.

The amplification transistor 72 has a gate connected to the FD 74, a drain connected to the power supply VDD, and a source connected to the VSL through the selection transistor 73. The amplification transistor 72 is a source follower and outputs a voltage (electrical signal) corresponding to the voltage of the FD 74 supplied to the gate to the VSL through the selection transistor 73.

The selection transistor 73 is turned on or off in response to a control signal SEL supplied from the driving section 32. When the selection transistor 73 is turned on, a voltage corresponding to the voltage of the FD 74 from the amplification transistor 72 is output to the VSL.

The FD 74 accumulates charges transferred from the photoelectric conversion elements 61 of the pixels 51 through the transfer transistors 63, and converts the charges to voltages.

With regard to the pixels 51 and the pixel signal generating section 53, which are configured as described above, the driving section 32 turns on the transfer transistors 62 with control signals OFGn, so that the transfer transistors 62 supply, to the event detecting section 52, photocurrents based on charges generated in the photoelectric conversion elements 61 of the pixels 51. With this, the event detecting section 52 receives a current that is the sum of the photocurrents from all the pixels 51 in the pixel block 41, which might also be only a single pixel.

According to a possible operation mode, when the event detecting section 52 detects, as an event, a change in photocurrent (sum of photocurrents) in the pixel block 41, the driving section 32 turns off the transfer transistors 62 of all the pixels 51 in the pixel block 41, to thereby stop the supply of the photocurrents to the event detecting section 52. Then, the driving section 32 sequentially turns on, with the control signals TRGn, the transfer transistors 63 of the pixels 51 in the pixel block 41 in which the event has been detected, so that the transfer transistors 63 transfers charges generated in the photoelectric conversion elements 61 to the FD 74. The FD 74 accumulates the charges transferred from (the photoelectric conversion elements 61 of) the pixels 51. Voltages corresponding to the charges accumulated in the FD 74 are output to the VSL, as pixel signals of the pixels 51, through the amplification transistor 72 and the selection transistor 73.

Alternatively, the transfer transistors 62, 63 may be used to switch the function of the pixel from event detection to pixel signal generation in a temporally predefined manner in order to provide a pixel 51 with time multiplexed function.

As described above, in the sensor section 21 (FIG. 2), only pixel signals of the pixels 51 in the pixel block 41 in which an event has been detected may be sequentially output to the VSL. The pixel signals output to the VSL are supplied to the AD conversion section 34 to be subjected to AD conversion. Preferably, pixel signal readout is independent of event detection and pixel signal selection via the selection transistor 73 follows the concepts of a rolling shutter.

Here, in the pixels 51 in the pixel block 41, the transfer transistors 63 can be turned on not sequentially but simultaneously. In this case, the sum of pixel signals of all the pixels 51 in the pixel block 41 can be output.

In the pixel array section 31 of FIG. 3, the pixel block 41 includes one or more pixels 51, and the one or more pixels 51 share the event detecting section 52 and the pixel signal generating section 53. Thus, in the case where the pixel block 41 includes a plurality of pixels 51, the numbers of the event detecting sections 52 and the pixel signal generating sections 53 can be reduced as compared to a case where the event detecting section 52 and the pixel signal generating section 53 are provided for each of the pixels 51, with the result that the scale of the pixel array section 31 can be reduced.

Note that, in the case where the pixel block 41 includes a plurality of pixels 51, the event detecting section 52 can be provided for each of the pixels 51. In the case where the plurality of pixels 51 in the pixel block 41 share the event detecting section 52, events are detected in units of the pixel blocks 41. In the case where the event detecting section 52 is provided for each of the pixels 51, however, events can be detected in units of the pixels 51.

Yet, even in the case where the plurality of pixels 51 in the pixel block 41 share the single event detecting section 52, events can be detected in units of the pixels 51 when the transfer transistors 62 of the plurality of pixels 51 are temporarily turned on in a time-division manner.

Further, in a case where there is no need to output pixel signals, e.g. since pixel signals are generated by a separate pixel array or a separate sensor device, the pixel block 41 can be formed without the pixel signal generating section 53. In the case where the pixel block 41 is formed without the pixel signal generating section 53, the sensor section 21 can be formed without the AD conversion section 34 and the transfer transistors 63. In this case, the scale of the sensor section 21 can be reduced. The sensor will then output the address of the pixel (block) in which the event occurred, if necessary with a time stamp.

Figure 5:
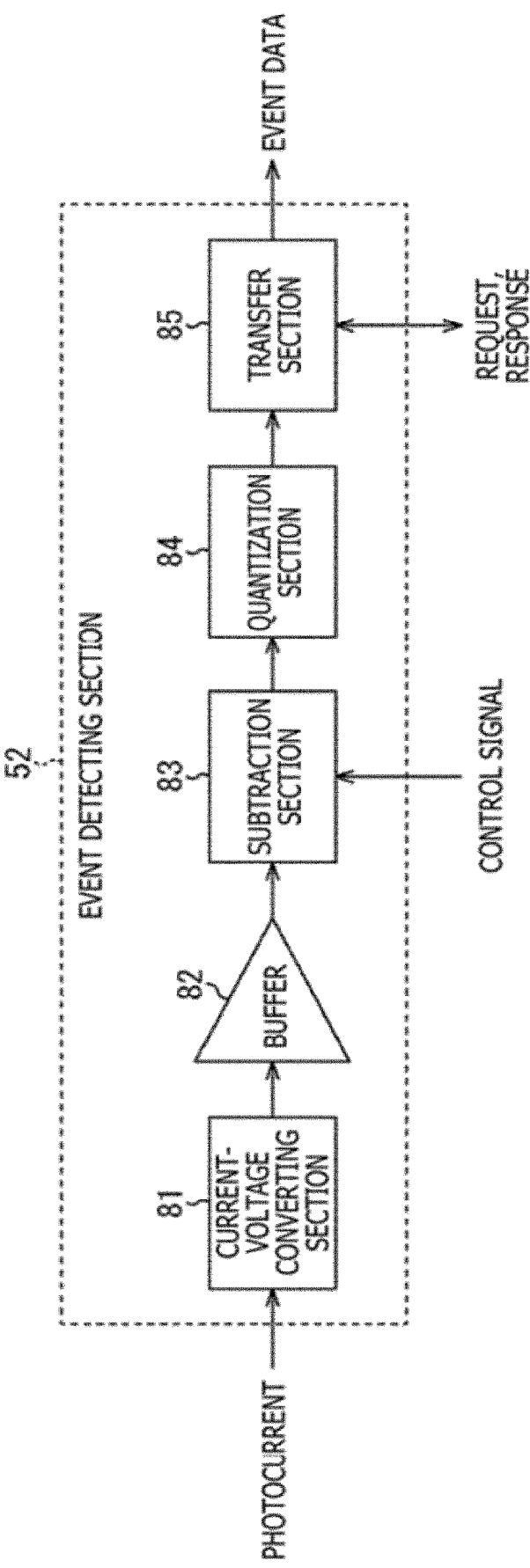
FIG. 5 is a schematic block diagram illustrating of an event detecting section.

FIG. 5 is a block diagram illustrating a configuration example of the event detecting section 52 of FIG. 3.

The event detecting section 52 includes a current-voltage converting section 81, a buffer 82, a subtraction section 83, a quantization section 84, and a transfer section 85.

The current-voltage converting section 81 converts (a sum of) photocurrents from the pixels 51 to voltages corresponding to the logarithms of the photocurrents (hereinafter also referred to as a "photovoltage") and supplies the voltages to the buffer 82.

The buffer 82 buffers photovoltages from the current-voltage converting section 81 and supplies the resultant to the subtraction section 83.

The subtraction section 83 calculates, at a timing instructed by a row driving signal that is a control signal from the driving section 32, a difference between the current photovoltage and a photovoltage at a timing slightly shifted from the current time, and supplies a difference signal corresponding to the difference to the quantization section 84.

The quantization section 84 quantizes difference signals from the subtraction section 83 to digital signals and supplies the quantized values of the difference signals to the transfer section 85 as event data.

The transfer section 85 transfers (outputs), on the basis of event data from the quantization section 84, the event data to the output section 35. That is, the transfer section 85 supplies a request for requesting the output of the event data to the arbiter 33. Then, when receiving a response indicating event data output permission to the request from the arbiter 33, the transfer section 85 outputs the event data to the output section 35.

Figure 6:
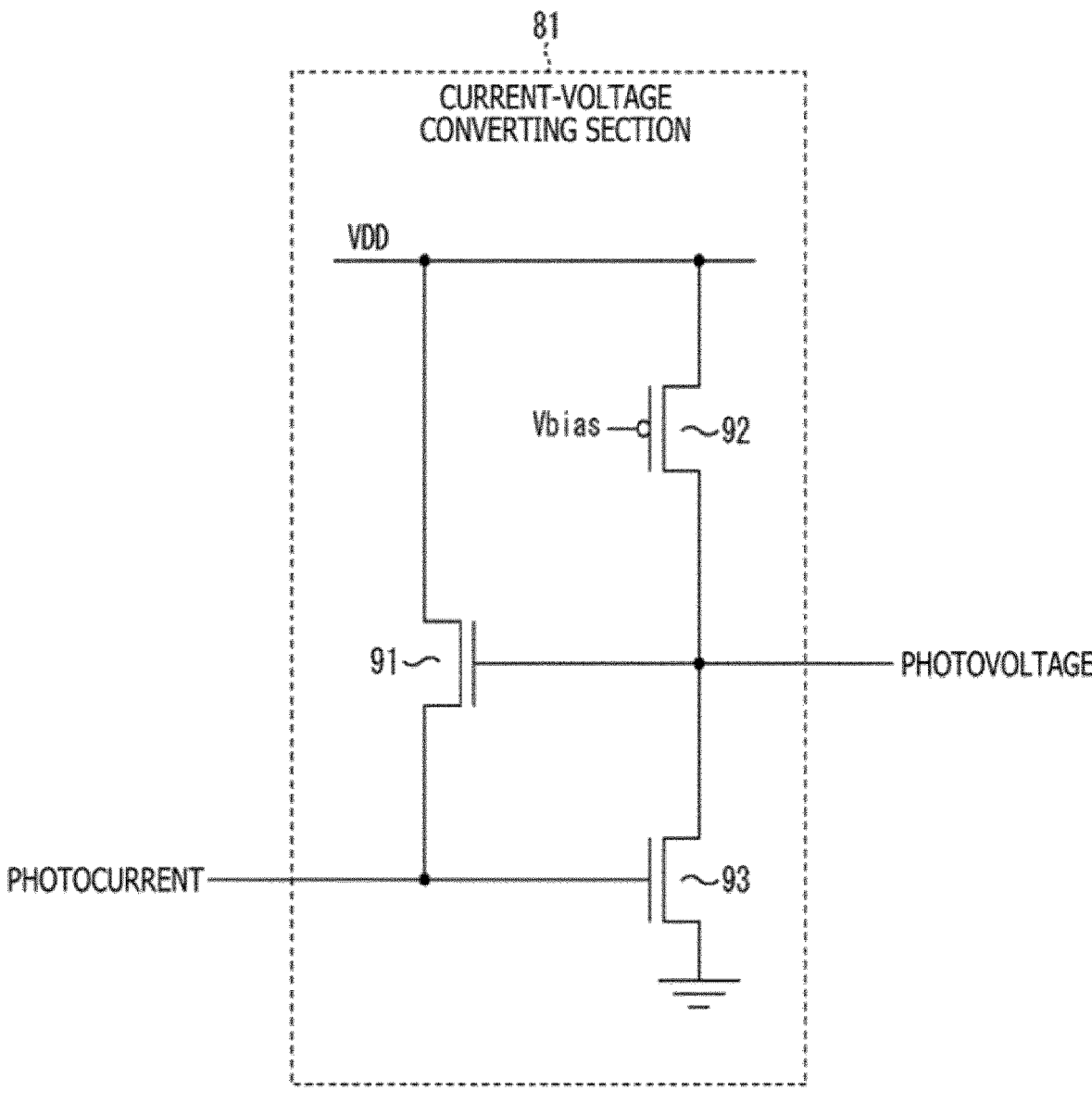
FIG. 6 is a schematic circuit diagram of a current-voltage converting section.

FIG. 6 is a circuit diagram illustrating a configuration example of the current-voltage converting section 81 of FIG. 5.

The current-voltage converting section 81 includes transistors 91 to 93. As the transistors 91 and 93, for example, N-type MOSFETs can be employed. As the transistor 92, for example, a P-type MOSFET can be employed.

The transistor 91 has a source connected to the gate of the transistor 93, and a photocurrent is supplied from the pixel 51 to the connecting point between the source of the transistor 91 and the gate of the transistor 93. The transistor

91 has a drain connected to the power supply VDD and a gate connected to the drain of the transistor 93.

The transistor 92 has a source connected to the power supply VDD and a drain connected to the connecting point between the gate of the transistor 91 and the drain of the transistor 93. A predetermined bias voltage Vbias is applied to the gate of the transistor 92. With the bias voltage Vbias, the transistor 92 is turned on or off, and the operation of the current-voltage converting section 81 is turned on or off depending on whether the transistor 92 is turned on or off.

The source of the transistor 93 is grounded.

In the current-voltage converting section 81, the transistor 91 has the drain connected on the power supply VDD side. The source of the transistor 91 is connected to the pixels 51 (FIG. 4), so that photocurrents based on charges generated in the photoelectric conversion elements 61 of the pixels 51 flow through the transistor 91 (from the drain to the source). The transistor 91 operates in a subthreshold region, and at the gate of the transistor 91, photovoltages corresponding to the logarithms of the photocurrents flowing through the transistor 91 are generated. As described above, in the current-voltage converting section 81, the transistor 91 converts photocurrents from the pixels 51 to photovoltages corresponding to the logarithms of the photocurrents.

In the current-voltage converting section 81, the transistor 91 has the gate connected to the connecting point between the drain of the transistor 92 and the drain of the transistor 93, and the photovoltages are output from the connecting point in question.

Figure 7:
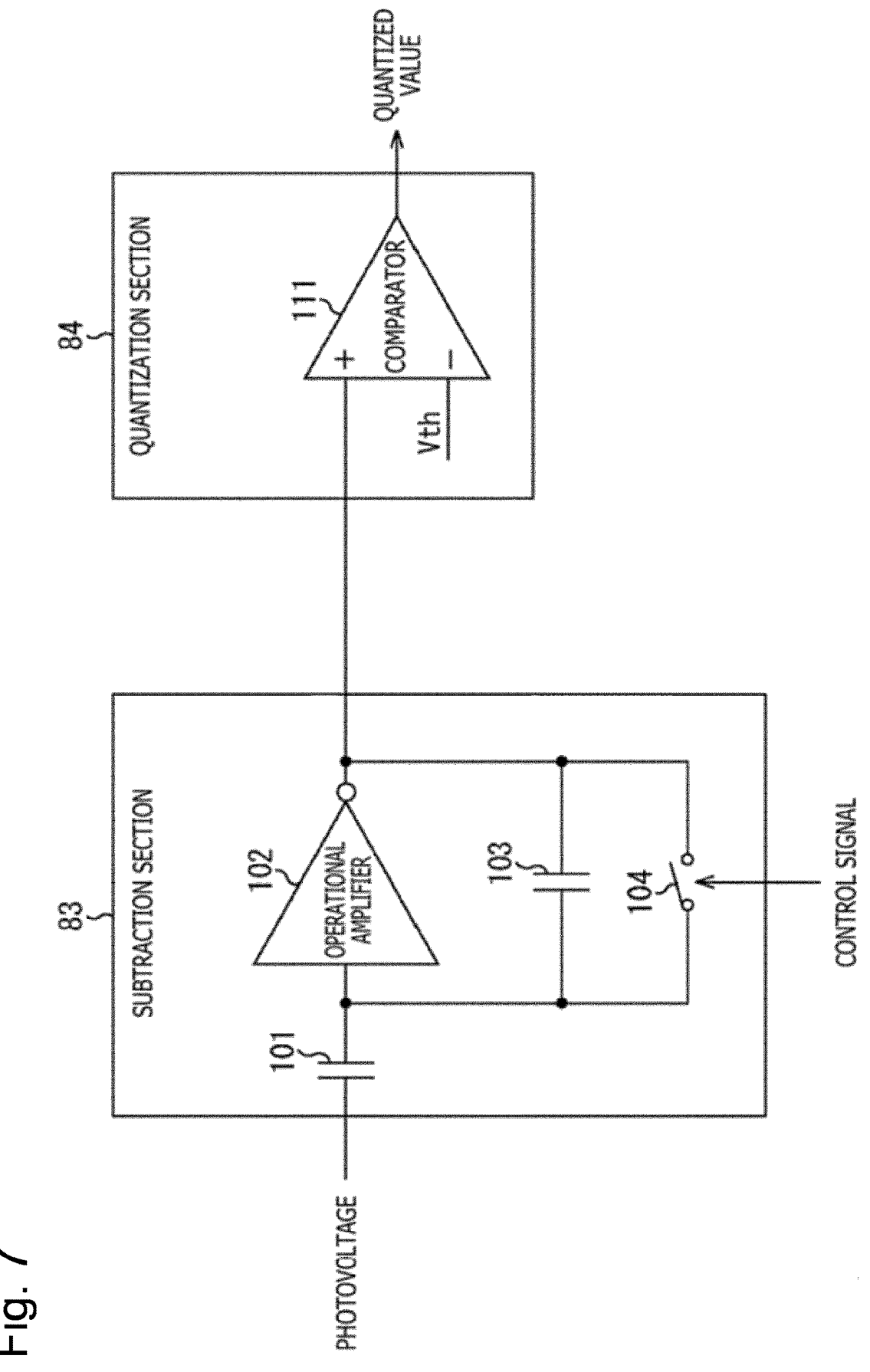
FIG. 7 is a schematic circuit diagram of a subtraction section and a quantization section.

FIG. 7 is a circuit diagram illustrating configuration examples of the subtraction section 83 and the quantization section 84 of FIG. 5.

The subtraction section 83 includes a capacitor 101, an operational amplifier 102, a capacitor 103, and a switch 104.

The quantization section 84 includes a comparator 111.

The capacitor 101 has one end connected to the output terminal of the buffer 82 (FIG. 5) and the other end connected to the input terminal (inverting input terminal) of the operational amplifier 102. Thus, photovoltages are input to the input terminal of the operational amplifier 102 through the capacitor 101.

The operational amplifier 102 has an output terminal connected to the non-inverting input terminal (+) of the comparator 111.

The capacitor 103 has one end connected to the input terminal of the operational amplifier 102 and the other end connected to the output terminal of the operational amplifier 102.

The switch 104 is connected to the capacitor 103 to switch the connections between the ends of the capacitor 103.

The switch 104 is turned on or off in response to a row driving signal that is a control signal from the driving section 32, to thereby switch the connections between the ends of the capacitor 103.

A photovoltage on the buffer 82 (FIG. 5) side of the capacitor 101 when the switch 104 is on is denoted by Vinit, and the capacitance (electrostatic capacitance) of the capacitor 101 is denoted by C1. The input terminal of the operational amplifier 102 serves as a virtual ground terminal, and a charge Qinit that is accumulated in the capacitor 101 in the case where the switch 104 is on is expressed by Expression (1).

$$Qinit = C1 \times Vinit \tag{1}$$

Further, in the case where the switch 104 is on, the connection between the ends of the capacitor 103 is cut (short-circuited), so that no charge is accumulated in the capacitor 103.

When a photovoltage on the buffer 82 (FIG. 5) side of the capacitor 101 in the case where the switch 104 has thereafter been turned off is denoted by Vafter, a charge Qafter that is accumulated in the capacitor 101 in the case where the switch 104 is off is expressed by Expression (2).

$$Qafter = C1 \times Vafter \qquad (2)$$

When the capacitance of the capacitor 103 is denoted by C2 and the output voltage of the operational amplifier 102 is denoted by Vout, a charge Q2 that is accumulated in the capacitor 103 is expressed by Expression (3).

$$Q2 = -C2 \times Vout \qquad (3)$$

Since the total amount of charges in the capacitors 101 and 103 does not change before and after the switch 104 is turned off, Expression (4) is established.

$$Qinit = Q + after + Q2 \qquad (4)$$

When Expression (1) to Expression (3) are substituted for Expression (4), Expression (5) is obtained.

$$Vout = -(C1/C2) \times (Vafter - Vinit) \qquad (5)$$

With Expression (5), the subtraction section 83 subtracts the photovoltage Vinit from the photovoltage Vafter, that is, calculates the difference signal (Vout) corresponding to a difference Vafter−Vinit between the photovoltages Vafter and Vinit. With Expression (5), the subtraction gain of the subtraction section 83 is C1/C2. Since the maximum gain is normally desired, C1 is preferably set to a large value and C2 is preferably set to a small value. Meanwhile, when C2 is too small, kTC noise increases, resulting in a risk of deteriorated noise characteristics. Thus, the capacitance C2 can only be reduced in a range that achieves acceptable noise. Further, since the pixel blocks 41 each have installed therein the event detecting section 52 including the subtraction section 83, the capacitances C1 and C2 have space constraints. In consideration of these matters, the values of the capacitances C1 and C2 are determined.

The comparator 111 compares a difference signal from the subtraction section 83 with a predetermined threshold (voltage) Vth (>0) applied to the inverting input terminal (−), thereby quantizing the difference signal. The comparator 111 outputs the quantized value obtained by the quantization to the transfer section 85 as event data.

For example, in a case where a difference signal is larger than the threshold Vth, the comparator 111 outputs an H (High) level indicating 1, as event data indicating the occurrence of an event. In a case where a difference signal is not larger than the threshold Vth, the comparator 111 outputs an L (Low) level indicating 0, as event data indicating that no event has occurred.

The transfer section 85 supplies a request to the arbiter 33 in a case where it is confirmed on the basis of event data from the quantization section 84 that a change in light amount that is an event has occurred, that is, in the case where the difference signal (Vout) is larger than the threshold Vth. When receiving a response indicating event data output permission, the transfer section 85 outputs the event data indicating the occurrence of the event (for example, H level) to the output section 35.

The output section 35 includes, in event data from the transfer section 85, location/address information regarding (the pixel block 41 including) the pixel 51 in which an event indicated by the event data has occurred and time point information indicating a time point at which the event has occurred, and further, as needed, the polarity of a change in light amount that is the event, i.e. whether the intensity did increase or decrease. The output section 35 outputs the event data.

As the data format of event data including location information regarding the pixel 51 in which an event has occurred, time point information indicating a time point at which the event has occurred, and the polarity of a change in light amount that is the event, for example, the data format called "AER (Address Event Representation)" can be employed.

Note that, a gain A of the entire event detecting section 52 is expressed by the following expression where the gain of the current-voltage converting section 81 is denoted by $CG_{log}$ and the gain of the buffer 82 is 1.

$$A = CG_{log}C1/C2(\Sigma i_{photo\_}n) \qquad (6)$$

Here, $i_{photo\_}n$ denotes a photocurrent of the n-th pixel 51 of the I×J pixels 51 in the pixel block 41. In Expression (6), Σ denotes the summation of n that takes integers ranging from 1 to I×J.

Note that, the pixel 51 can receive any light as incident light with an optical filter through which predetermined light passes, such as a color filter. For example, in a case where the pixel 51 receives visible light as incident light, event data indicates the occurrence of changes in pixel value in images including visible objects. Further, for example, in a case where the pixel 51 receives, as incident light, infrared light, millimeter waves, or the like for ranging, event data indicates the occurrence of changes in distances to objects. In addition, for example, in a case where the pixel 51 receives infrared light for temperature measurement, as incident light, event data indicates the occurrence of changes in temperature of objects. In the present embodiment, the pixel 51 is assumed to receive visible light as incident light.

Figure 8:
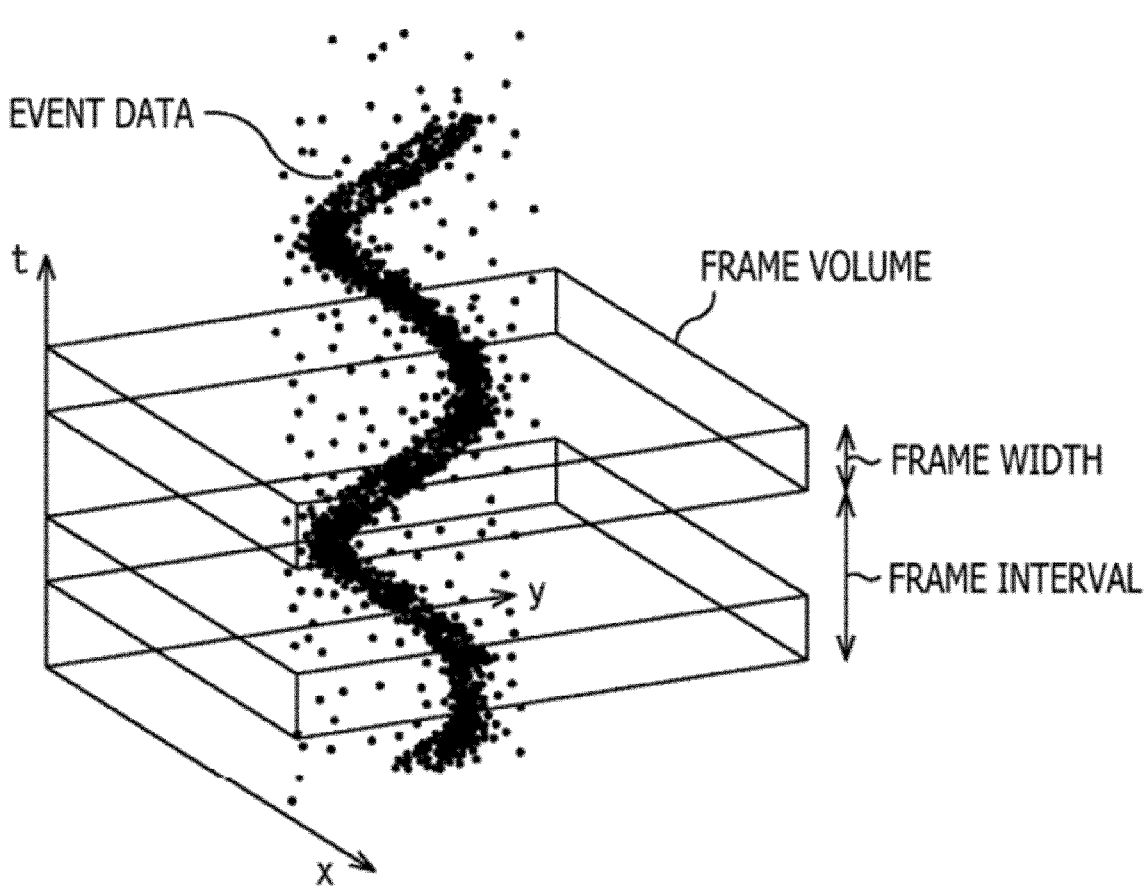
FIG. 8 is a schematic diagram of a frame data generation method based on event data.

FIG. 8 is a diagram illustrating an example of a frame data generation method based on event data.

The logic section 22 sets a frame interval and a frame width on the basis of an externally input command, for example. Here, the frame interval represents the interval of frames of frame data that is generated on the basis of event data. The frame width represents the time width of event data that is used for generating frame data on a single frame. A frame interval and a frame width that are set by the logic section 22 are also referred to as a "set frame interval" and a "set frame width," respectively.

The logic section 22 generates, on the basis of the set frame interval, the set frame width, and event data from the sensor section 21, frame data that is image data in a frame format, to thereby convert the event data to the frame data.

That is, the logic section 22 generates, in each set frame interval, frame data on the basis of event data in the set frame width from the beginning of the set frame interval.

Here, it is assumed that event data includes time point information $t_i$ indicating a time point at which an event has occurred (hereinafter also referred to as an "event time point") and coordinates (x, y) serving as location information regarding (the pixel block 41 including) the pixel 51 in which the event has occurred (hereinafter also referred to as an "event location").

In FIG. 8, in a three-dimensional space (time and space) with the x axis, the y axis, and the time axis t, points representing event data are plotted on the basis of the event time point t and the event location (coordinates) (x, y) included in the event data.

That is, when a location (x, y, t) on the three-dimensional space indicated by the event time point t and the event location (x, y) included in event data is regarded as the space-time location of an event, in FIG. 8, the points representing the event data are plotted on the space-time locations (x, y, t) of the events.

The logic section 22 starts to generate frame data on the basis of event data by using, as a generation start time point at which frame data generation starts, a predetermined time point, for example, a time point at which frame data generation is externally instructed or a time point at which the sensor device 10 is powered on.

Here, cuboids each having the set frame width in the direction of the time axis t in the set frame intervals, which appear from the generation start time point, are referred to as a "frame volume." The size of the frame volume in the x-axis direction or the y-axis direction is equal to the number of the pixel blocks 41 or the pixels 51 in the x-axis direction or the y-axis direction, for example.

The logic section 22 generates, in each set frame interval, frame data on a single frame on the basis of event data in the frame volume having the set frame width from the beginning of the set frame interval.

Frame data can be generated by, for example, setting white to a pixel (pixel value) in a frame at the event location (x, y) included in event data and setting a predetermined color such as gray to pixels at other locations in the frame.

Besides, in a case where event data includes the polarity of a change in light amount that is an event, frame data can be generated in consideration of the polarity included in the event data. For example, white can be set to pixels in the case a positive polarity, while black can be set to pixels in the case of a negative polarity. Alternatively, polarity values +1 and −1 may be assigned for each pixel in which an event of the according polarity has been detected and 0 may be assigned to a pixel in which no event was detected.

In addition, in the case where pixel signals of the pixels 51 are also output when event data is output as described with reference to FIG. 3 and FIG. 4, frame data can be generated on the basis of the event data by using the pixel signals of the pixels 51. That is, frame data can be generated by setting, in a frame, a pixel at the event location (x, y) (in a block corresponding to the pixel block 41) included in event data to a pixel signal of the pixel 51 at the location (x, y) and setting a predetermined color such as gray to pixels at other locations.

Note that, in the frame volume, there are a plurality of pieces of event data that are different in the event time point t but the same in the event location (x, y) in some cases. In this case, for example, event data at the latest or oldest event time point t can be prioritized. Further, in the case where event data includes polarities, the polarities of a plurality of pieces of event data that are different in the event time point t but the same in the event location (x, y) can be added together, and a pixel value based on the added value obtained by the addition can be set to a pixel at the event location (x, y).

Here, in a case where the frame width and the frame interval are the same, the frame volumes are adjacent to each other without any gap. Further, in a case where the frame interval is larger than the frame width, the frame volumes are arranged with gaps. In a case where the frame width is larger than the frame interval, the frame volumes are arranged to be partly overlapped with each other. Event time stamp according to the end of the frame width can be set to all values within the event frame.

Figure 9:
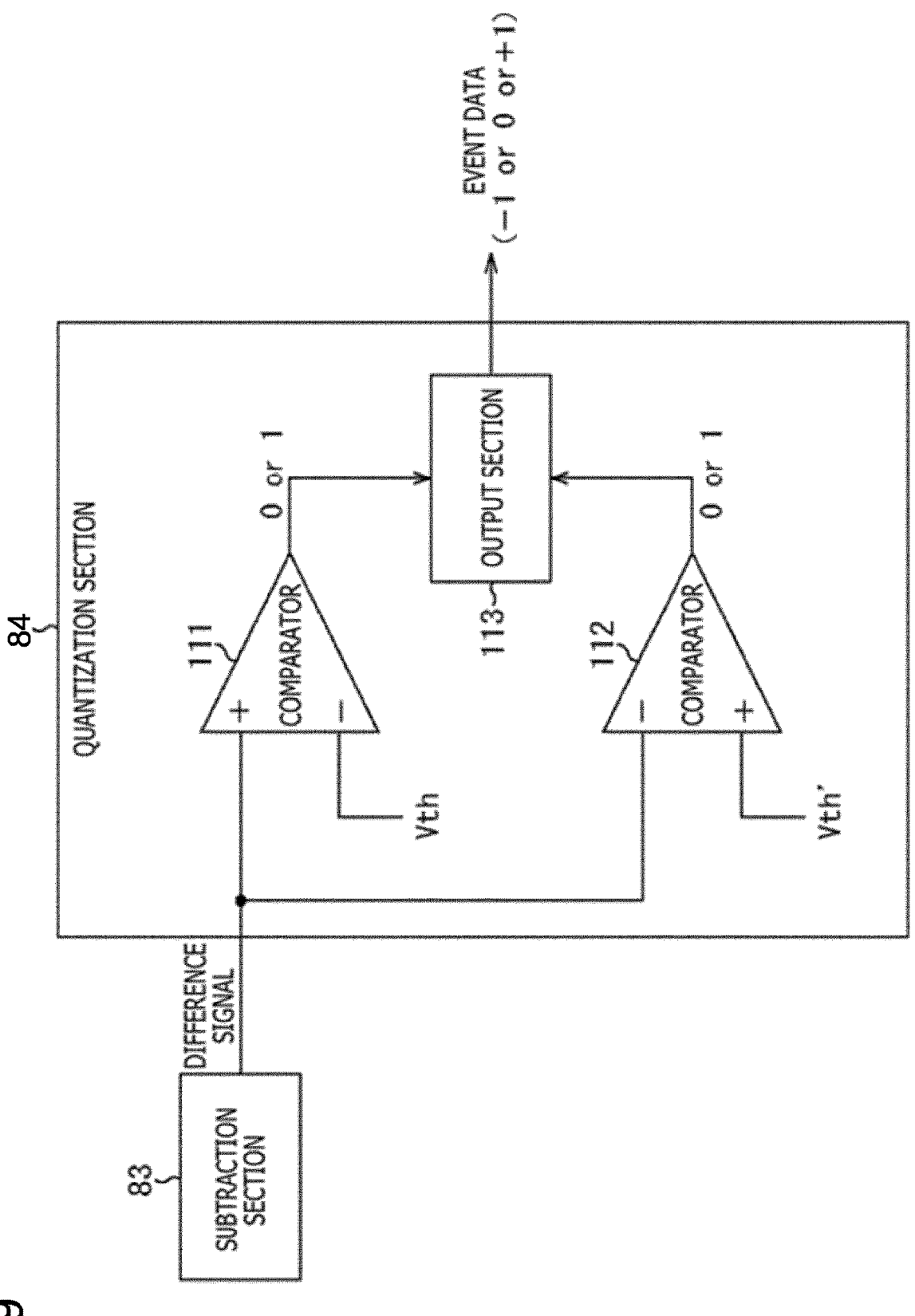
FIG. 9 is a schematic block diagram of another quantization section.

FIG. 9 is a block diagram illustrating another configuration example of the quantization section 84 of FIG. 5.

Note that, in FIG. 9, parts corresponding to those in the case of FIG. 7 are denoted by the same reference signs, and the description thereof is omitted as appropriate below.

In FIG. 9, the quantization section 84 includes comparators 111 and 112 and an output section 113.

Thus, the quantization section 84 of FIG. 9 is similar to the case of FIG. 7 in including the comparator 111. However, the quantization section 84 of FIG. 9 is different from the case of FIG. 7 in newly including the comparator 112 and the output section 113.

The event detecting section 52 (FIG. 5) including the quantization section 84 of FIG. 9 detects, in addition to events, the polarities of changes in light amount that are events.

In the quantization section 84 of FIG. 9, the comparator 111 outputs, in the case where a difference signal is larger than the threshold Vth, the H level indicating 1, as event data indicating the occurrence of an event having the positive polarity. The comparator 111 outputs, in the case where a difference signal is not larger than the threshold Vth, the L level indicating 0, as event data indicating that no event having the positive polarity has occurred.

Further, in the quantization section 84 of FIG. 9, a threshold Vth' (<Vth) is supplied to the non-inverting input terminal (+) of the comparator 112, and difference signals are supplied to the inverting input terminal (−) of the comparator 112 from the subtraction section 83. Here, for the sake of simple description, it is assumed that the threshold Vth' is equal to −Vth, for example, which needs however not to be the case.

The comparator 112 compares a difference signal from the subtraction section 83 with the threshold Vth' applied to the inverting input terminal (−), thereby quantizing the difference signal. The comparator 112 outputs, as event data, the quantized value obtained by the quantization.

For example, in a case where a difference signal is smaller than the threshold Vth' (the absolute value of the difference signal having a negative value is larger than the threshold Vth), the comparator 112 outputs the H level indicating 1, as event data indicating the occurrence of an event having the negative polarity. Further, in a case where a difference signal is not smaller than the threshold Vth' (the absolute value of the difference signal having a negative value is not larger than the threshold Vth), the comparator 112 outputs the L level indicating 0, as event data indicating that no event having the negative polarity has occurred.

The output section 113 outputs, on the basis of event data output from the comparators 111 and 112, event data indicating the occurrence of an event having the positive polarity, event data indicating the occurrence of an event having the negative polarity, or event data indicating that no event has occurred to the transfer section 85.

For example, the output section 113 outputs, in a case where event data from the comparator 111 is the H level indicating 1, +V volts indicating +1, as event data indicating the occurrence of an event having the positive polarity, to the transfer section 85. Further, the output section 113 outputs, in a case where event data from the comparator 112 is the H level indicating 1, −V volts indicating −1, as event data indicating the occurrence of an event having the negative polarity, to the transfer section 85. In addition, the output section 113 outputs, in a case where each event data from the comparators 111 and 112 is the L level indicating 0, 0 volts (GND level) indicating 0, as event data indicating that no event has occurred, to the transfer section 85.

The transfer section 85 supplies a request to the arbiter 33 in the case where it is confirmed on the basis of event data from the output section 113 of the quantization section 84 that a change in light amount that is an event having the positive polarity or the negative polarity has occurred. After receiving a response indicating event data output permission, the transfer section 85 outputs event data indicating the occurrence of the event having the positive polarity or the negative polarity (+V volts indicating 1 or −V volts indicating −1) to the output section 35.

Preferably, the quantization section 84 has a configuration as illustrated in FIG. 9.

Figure 10:
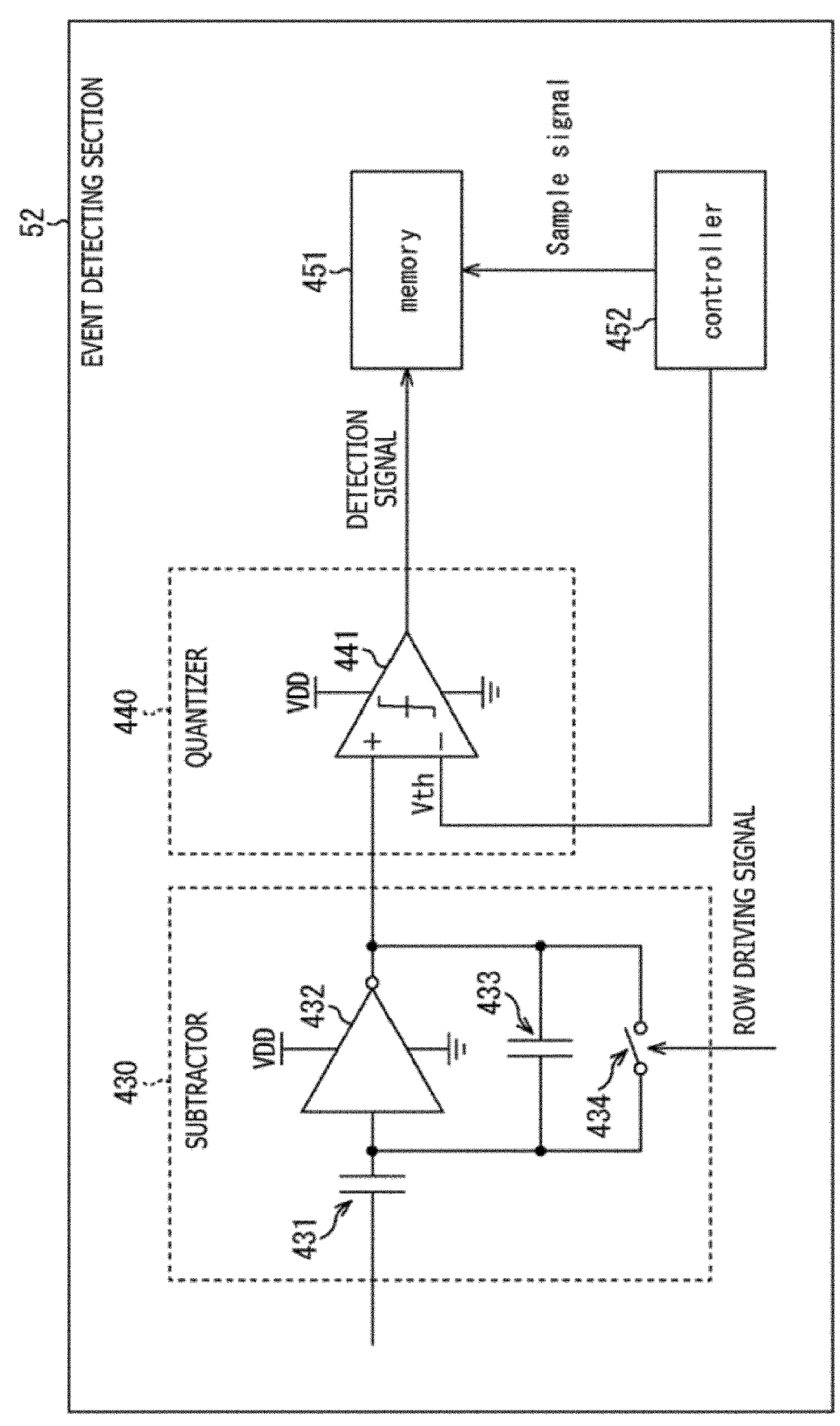
FIG. 10 is a schematic diagram of another event detecting section.

FIG. 10 is a diagram illustrating another configuration example of the event detecting section 52.

In FIG. 10, the event detecting section 52 includes a subtractor 430, a quantizer 440, a memory 451, and a controller 452. The subtractor 430 and the quantizer 440 correspond to the subtraction section 83 and the quantization section 84, respectively.

Note that, in FIG. 10, the event detecting section 52 further includes blocks corresponding to the current-voltage converting section 81 and the buffer 82, but the illustrations of the blocks are omitted in FIG. 10.

The subtractor 430 includes a capacitor 431, an operational amplifier 432, a capacitor 433, and a switch 434. The capacitor 431, the operational amplifier 432, the capacitor 433, and the switch 434 correspond to the capacitor 101, the operational amplifier 102, the capacitor 103, and the switch 104, respectively.

The quantizer 440 includes a comparator 441. The comparator 441 corresponds to the comparator 111.

The comparator 441 compares a voltage signal (difference signal) from the subtractor 430 with the predetermined threshold voltage Vth applied to the inverting input terminal (−). The comparator 441 outputs a signal indicating the comparison result, as a detection signal (quantized value).

The voltage signal from the subtractor 430 may be input to the input terminal (−) of the comparator 441, and the predetermined threshold voltage Vth may be input to the input terminal (+) of the comparator 441.

The controller 452 supplies the predetermined threshold voltage Vth applied to the inverting input terminal (−) of the comparator 441. The threshold voltage Vth which is supplied may be changed in a time-division manner. For example, the controller 452 supplies a threshold voltage Vth1 corresponding to ON events (for example, positive changes in photocurrent) and a threshold voltage Vth2 corresponding to OFF events (for example, negative changes in photocurrent) at different timings to allow the single comparator to detect a plurality of types of address events (events).

The memory 451 accumulates output from the comparator 441 on the basis of Sample signals supplied from the controller 452. The memory 451 may be a sampling circuit, such as a switch, plastic, or capacitor, or a digital memory circuit, such as a latch or flip-flop. For example, the memory 451 may hold, in a period in which the threshold voltage Vth2 corresponding to OFF events is supplied to the inverting input terminal (−) of the comparator 441, the result of comparison by the comparator 441 using the threshold voltage Vth1 corresponding to ON events.

Note that, the memory 451 may be omitted, may be provided inside the pixel (pixel block 41), or may be provided outside the pixel.

Figure 11:
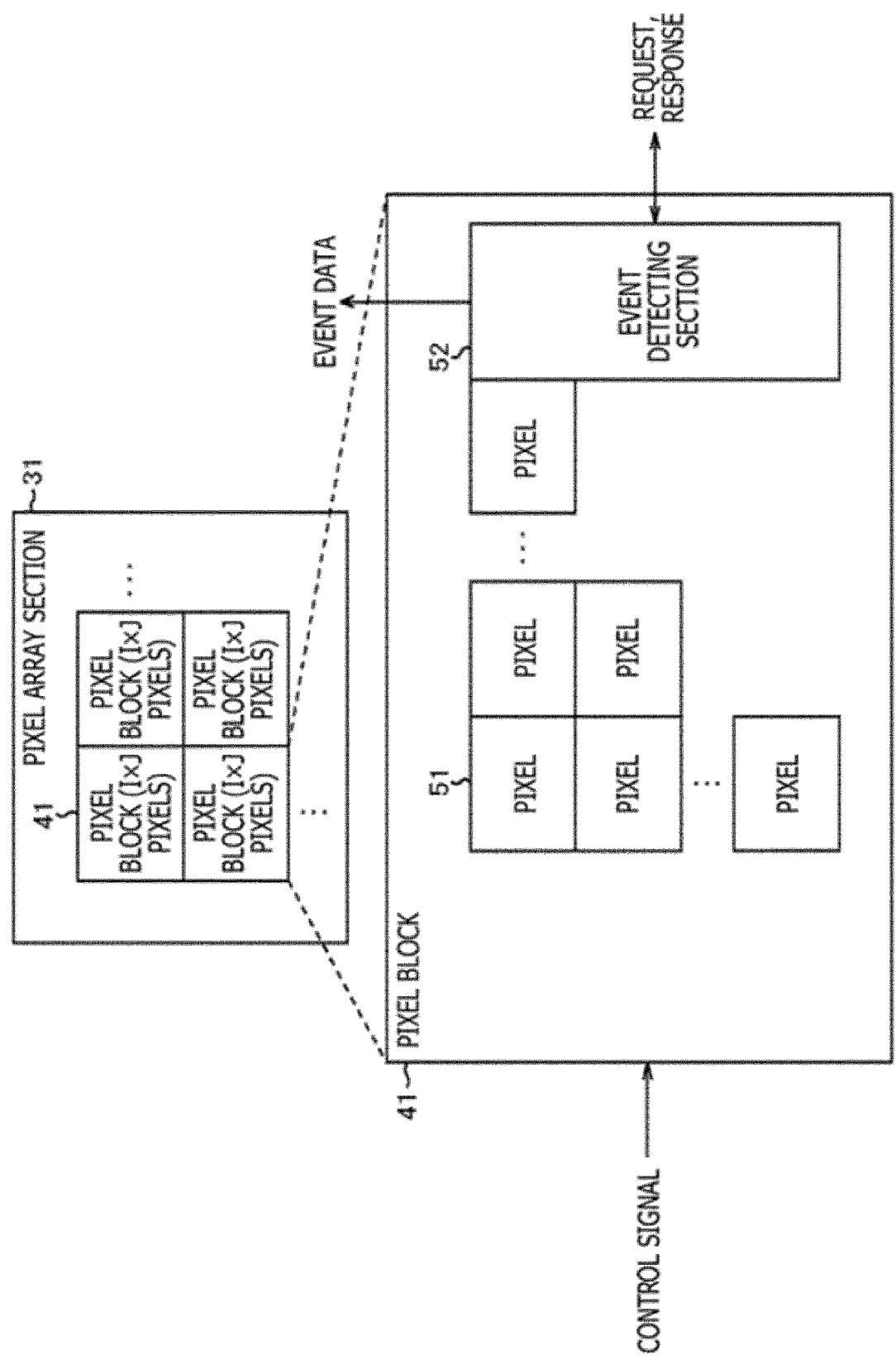
FIG. 11 is a schematic block diagram of another pixel array section.

FIG. 11 is a block diagram illustrating another configuration example of the pixel array section 31 of FIG. 2, in which the pixels only serve event detection. Thus, FIG. 11 does not show a hybrid sensor, but an EVS/DVS.

Note that, in FIG. 11, parts corresponding to those in the case of FIG. 3 are denoted by the same reference signs, and the description thereof is omitted as appropriate below.

In FIG. 11, the pixel array section 31 includes the plurality of pixel blocks 41. The pixel block 41 includes the I×J pixels 51 that are one or more pixels and the event detecting section 52.

Thus, the pixel array section 31 of FIG. 11 is similar to the case of FIG. 3 in that the pixel array section 31 includes the plurality of pixel blocks 41 and that the pixel block 41 includes one or more pixels 51 and the event detecting section 52. However, the pixel array section 31 of FIG. 11 is different from the case of FIG. 3 in that the pixel block 41 does not include the pixel signal generating section 53.

As described above, in the pixel array section 31 of FIG. 11, the pixel block 41 does not include the pixel signal generating section 53, so that the sensor section 21 (FIG. 2) can be formed without the AD conversion section 34.

Figure 12:
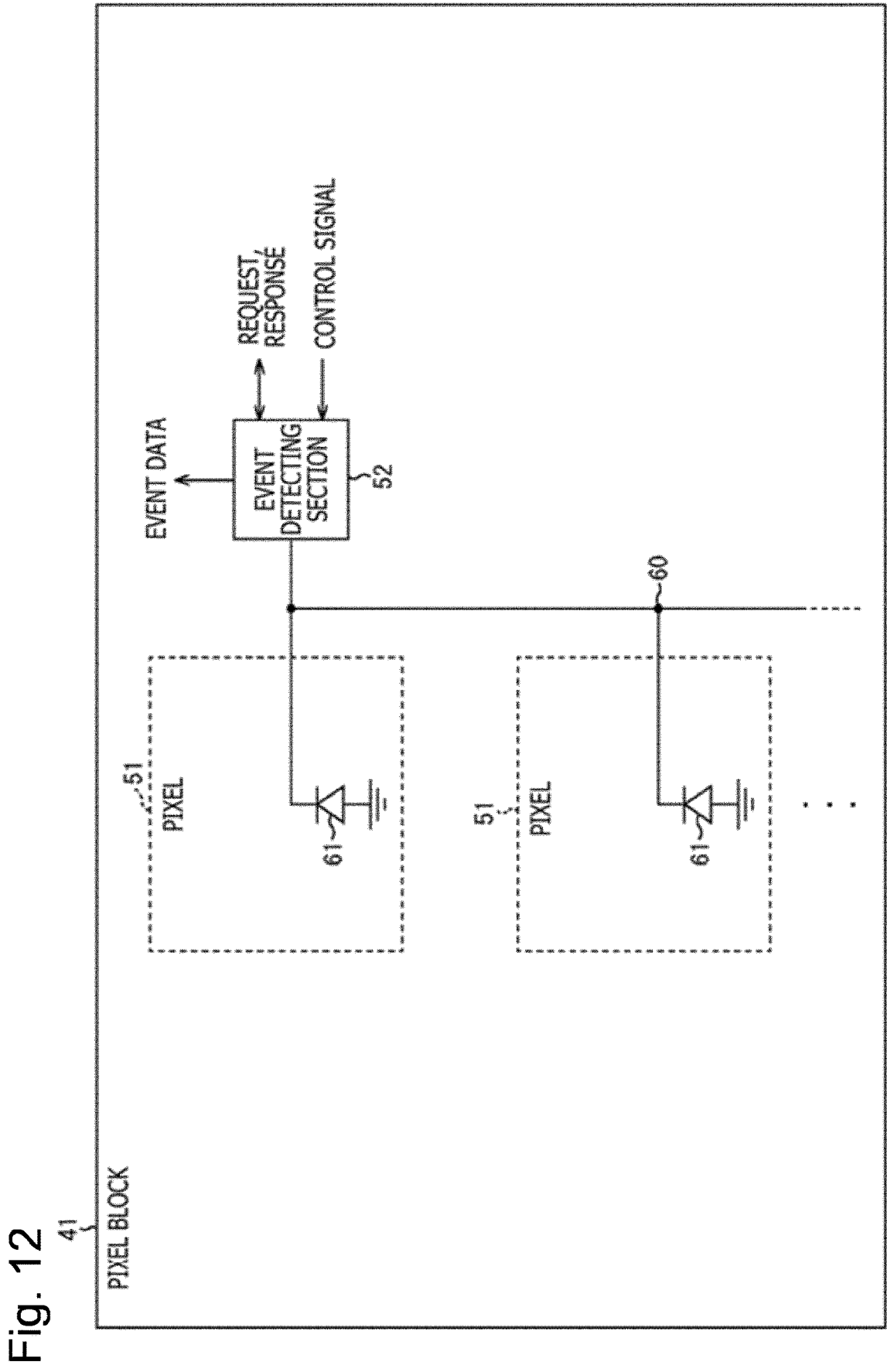
FIG. 12 is a schematic circuit diagram of another pixel block.

FIG. 12 is a circuit diagram illustrating a configuration example of the pixel block 41 of FIG. 11.

As described with reference to FIG. 11, the pixel block 41 includes the pixels 51 and the event detecting section 52, but does not include the pixel signal generating section 53.

In this case, the pixel 51 can only include the photoelectric conversion element 61 without the transfer transistors 62 and 63.

Note that, in the case where the pixel 51 has the configuration illustrated in FIG. 12, the event detecting section 52 can output a voltage corresponding to a photocurrent from the pixel 51, as a pixel signal.

Above, the sensor device 10 was described to be an asynchronous imaging device configured to read out events by the asynchronous readout system. However, the event readout system is not limited to the asynchronous readout system and may be the synchronous readout system. An imaging device to which the synchronous readout system is applied is a scan type imaging device that is the same as a general imaging device configured to perform imaging at a predetermined frame rate.

Figure 13:
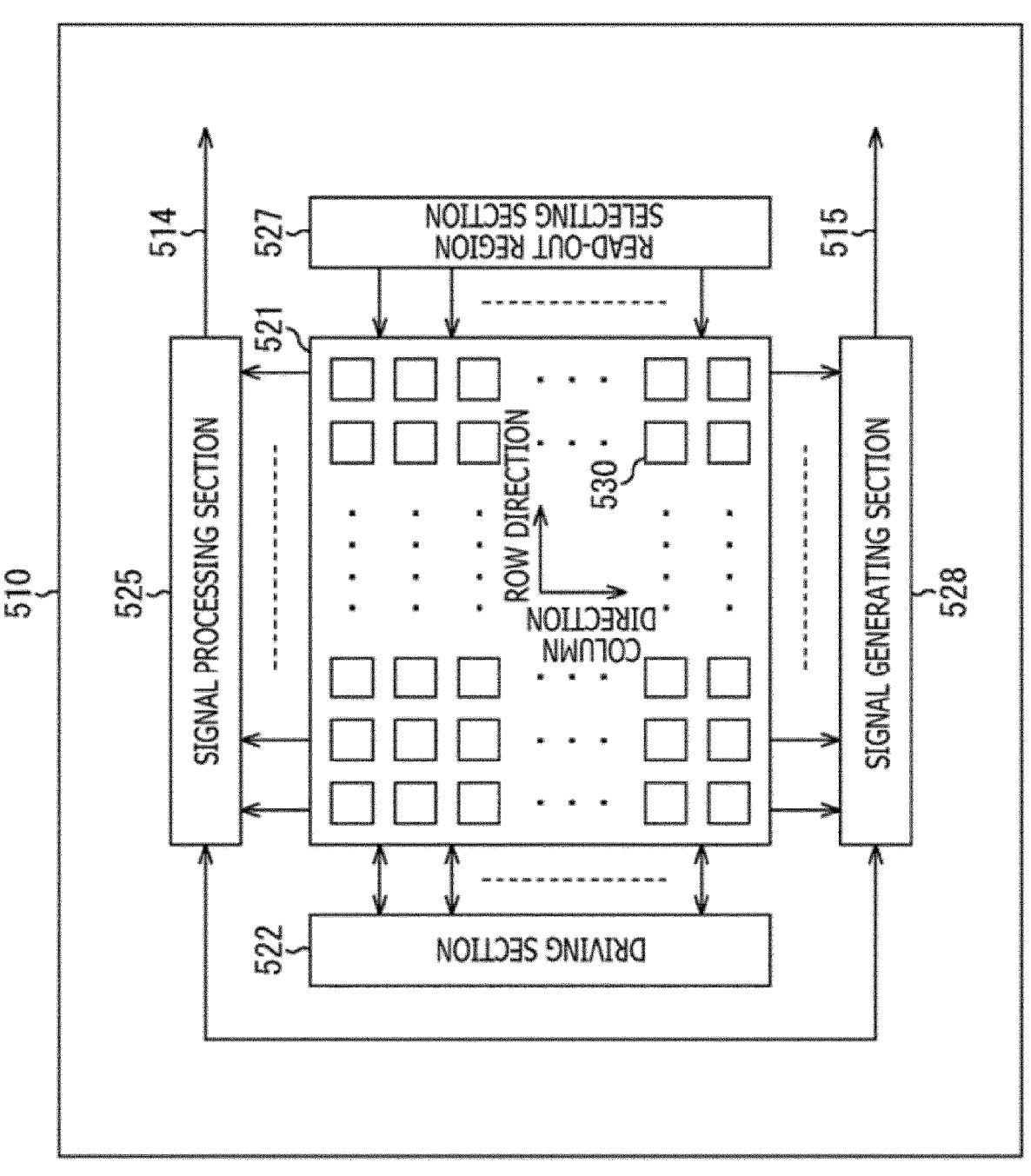
FIG. 13 is a schematic block diagram of a scan-type sensor device.

FIG. 13 is a block diagram illustrating a configuration example of a scan type imaging device, i.e. of an active pixel sensor, APS, which may be used in the sensor device 10 together with the EVS illustrated in FIG. 12.

As illustrated in FIG. 13, an imaging device 510 includes a pixel array section 521, a driving section 522, a signal processing section 525, a read-out region selecting section 527, and an optional signal generating section 528.

The pixel array section 521 includes a plurality of pixels 530. The plurality of pixels 530 each output an output signal in response to a selection signal from the read-out region selecting section 527. The plurality of pixels 530 can each include an in-pixel quantizer as illustrated in FIG. 10, for example. The plurality of pixels 530 output output signals corresponding to the amounts of change in light intensity. The plurality of pixels 530 may be two-dimensionally disposed in a matrix as illustrated in FIG. 13.

The driving section 522 drives the plurality of pixels 530, so that the pixels 530 output pixel signals generated in the pixels 530 to the signal processing section 525 through an output line 514. Note that, the driving section 522 and the signal processing section 525 are circuit sections for acquiring grayscale information.

The read-out region selecting section 527 selects some of the plurality of pixels 530 included in the pixel array section 521. For example, the read-out region selecting section 527 selects one or a plurality of rows included in the two-dimensional matrix structure corresponding to the pixel array section 521. The read-out region selecting section 527 sequentially selects one or a plurality of rows on the basis of a cycle set in advance, e.g. based on a rolling shutter. Further, the read-out region selecting section 527 may determine a selection region on the basis of requests from the pixels 530 in the pixel array section 521.

The optional signal generating section 528 may generate, on the basis of output signals of the pixels 530 selected by the read-out region selecting section 527, event signals corresponding to active pixels in which events have been detected of the selected pixels 530. The events mean an event that the intensity of light changes. The active pixels mean the pixel 530 in which the amount of change in light intensity corresponding to an output signal exceeds or falls below a threshold set in advance. For example, the signal generating section 528 compares output signals from the pixels 530 with a reference signal, and detects, as an active pixel, a pixel that outputs an output signal larger or smaller than the reference signal. The signal generating section 528 generates an event signal (event data) corresponding to the active pixel.

The signal generating section 528 can include, for example, a column selecting circuit configured to arbitrate signals input to the signal generating section 528. Further, the signal generating section 528 can output not only information regarding active pixels in which events have been detected, but also information regarding non-active pixels in which no event has been detected.

The signal generating section 528 outputs, through an output line 515, address information and timestamp information (for example, (X, Y, T)) regarding the active pixels in which the events have been detected. However, the data that is output from the signal generating section 528 may not only be the address information and the timestamp information, but also information in a frame format (for example, (0, 0, 1, 0, . . . )).

Above different sensor designs have been discussed which combine the capability to generate event data and full intensity pixel signals e.g. by sharing pixel signals between different circuitries, by dividing a pixel to have both functionalities or by combining event data and pixel signals of different sensor chips or sensors. It is understood that the above is merely exemplary and that any other implementation may be chosen that allows a concurrent generation of event data and intensity signals.

Figure 14:
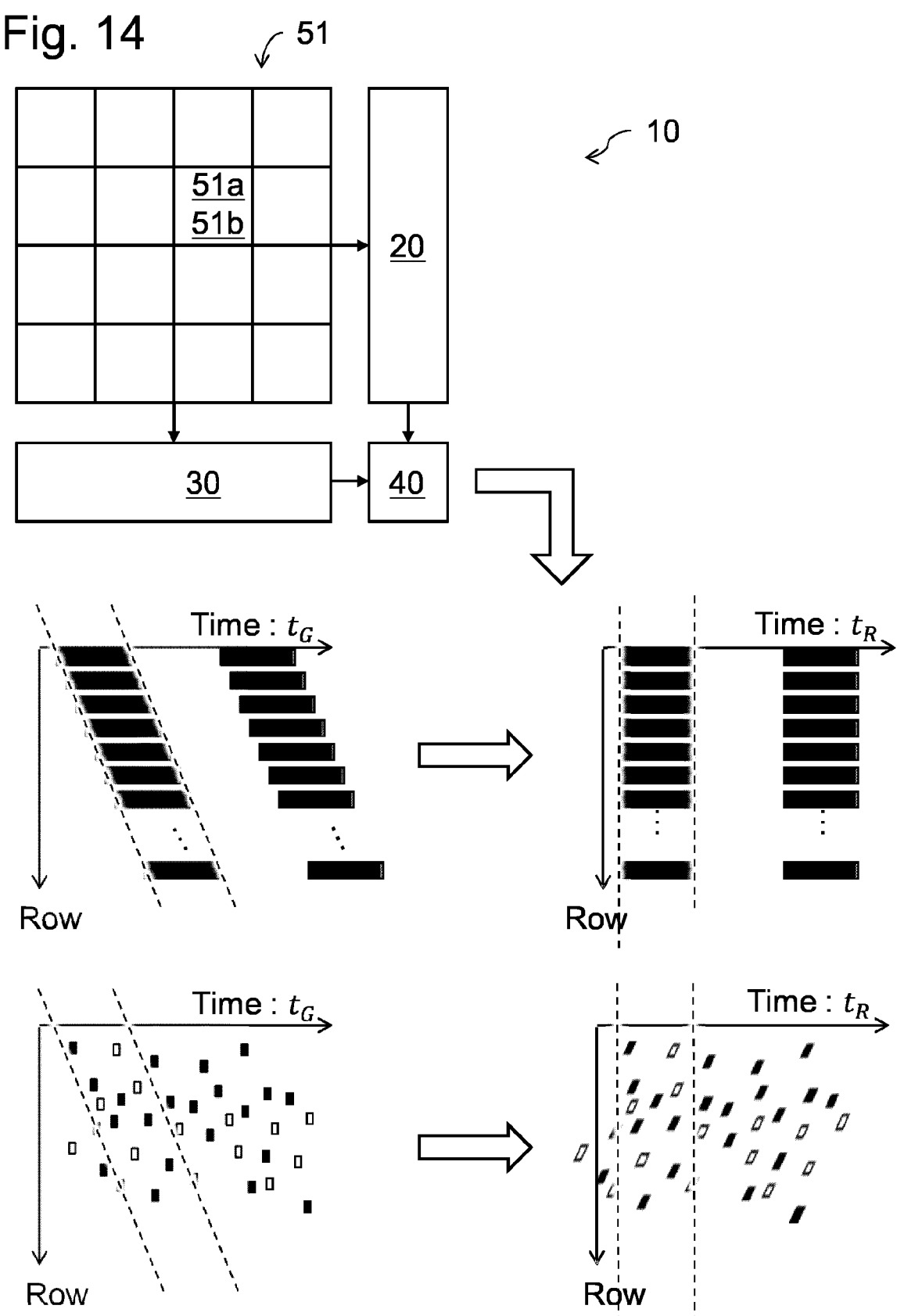
FIG. 14 is a schematic block diagram of a sensor device and its function.

In all these examples a sensor device 10 as shown in FIG. 14 is provided that comprises a plurality of pixels 51 that are each configured to receive light and perform photoelectric conversion to generate an electrical signal. The sensor device 10 further comprises event detection circuitry 20 that is configured to generate event data by detecting as events intensity changes above a predetermined threshold of the light received by each of event detecting pixels 51*a* that form a first subset of the pixels 51, and pixel signal generating circuitry 30 that is configured to generate pixel signals indicating intensity values of the light received by each of intensity detecting pixels 51*b* that form a second subset of the pixels 51, the intensity detecting pixels 51*b* being arranged in a two dimensional array comprising a plurality of pixel rows.

As illustrated in FIG. 14, each of the pixels 51 may function as event detection pixel 51*a* and as intensity detecting pixel 51*b*. The pixels 51 may have both functionalities at the same time by distributing the electrical signal generated by photoelectric conversion at the same time to the event detection circuitry 20 and the pixel signal generating circuitry 30.

Alternatively, the pixels 51 may be switched between event detection and pixel signal generation as e.g. described above with respect to FIG. 4 and schematically illustrated in FIG. 15A. Here, it is assumed that all pixels 51 operate first as event detecting pixels 51*a* and switch then to an operation as intensity detecting or APS pixels 51*b*. Afterwards, the cycle starts again with event detection functionality.

Thus, the first subset of pixels 51 may be equal to the second subset of pixels 51. Alternatively, the first and second subsets of pixels 51 may at least in parts be different. This is exemplarily illustrated in FIGS. 15B to 15E.

Here, FIG. 15B shows a situation in which event detecting pixels 51*a* are arranged in an alternating manner with intensity detecting pixels 51*b*. Thus, it is possible to capture event and intensity information simultaneously by using different sets of EVS and APS pixels.

FIGS. 15C and 15D show examples of RGB-Event hybrid sensors in which color filters are provided on each of the intensity detecting pixels. This allows capturing both, color image frames and events. Here, different exposure times may be used for pixel signal and event data readout, e.g. a fixed frame rate can be set for readout of RGB frames, while events are readout asynchronously at the same time. As schematically indicated in FIG. 15D pixels having the same color filter or the same functionality can be read out together as single pixels.

Of course, it is to be understood that the arrangement of color filters and event detecting pixels 51*a* within the pixel array may be different than shown in FIGS. 15B to 15D. Moreover, the sensor device 10 may include further event detecting pixels 51*a* and/or intensity detecting pixels 51*b* that have both functionalities and/or are not part of the pixel array.

The above examples relate to pixels 51 belonging to different pixel subsets, but being part of a single sensor chip. However, the event detecting pixels 51*a* and the intensity detecting pixels 51*b* may also be part of different sensor chips or even different cameras of the sensor device 10.

For example, FIG. 15D shows a stereo camera constituting the sensor device 10 in which one camera uses event detecting pixels 51*a*, i.e. is an EVS, while the other camera uses intensity detecting pixels 51*b*, i.e. is an APS. Here the EVS captures moving objects (like the car in the example of FIG. 15D) with a high time resolution and low latency, while the APS captures all objects on the scene (car and tree) with a smaller temporal resolution.

In all of the above examples the generation of event data and the generation of pixel signals are synchronized such as to allow an assignment of time according to the same time coordinate to event data generation and pixel signal generation. Differently stated, both the event detection circuitry 20 and the pixel signal generation circuitry 30 operate based on the same clock cycle, not only in the case of a shared pixel array, but also for a system of geometrically separated pixel arrays as the one of FIG. 15D.

As illustrated in FIG. 14 a control unit 40 is part of the sensor device 10. The control unit 40 may be constituted by any circuitry, processor or the like that is capable to carry out the functions described below. The control unit 40 may be implemented as hardware, as software or as a mixture of both.

The control unit 40 is configured to read out the pixel signals by applying a rolling shutter that starts readout of the pixel signals of adjacent pixel rows at times separated by a predetermined time period and to assign time stamps to each pixel signal that indicate the time of readout of the corresponding pixel row, e.g. by indicating the start or end time of the readout. In this manner the in principle known function of a rolling shutter APS is implemented by the intensity detecting pixels 51b.

In order to assign to each detected event a corresponding pixel row number, the control unit 40 further associates with each other event detecting pixels 51a and intensity detecting pixels 51b that have a corresponding field of view. This may be done in any suitable manner.

For example, pixel row numbers (and column numbers) can be assigned to events based on pixels that function as both, event detecting pixels 51a and intensity detecting pixels 51b. In particular, if all pixels 51 have both functionalities as shown in FIG. 14 or 15A, the position of a pixel 51 in the pixel array automatically assigns a row number. Based on this information pixel row numbers can be extrapolated to event detecting pixels 51a that do not have pixel signal generating functionalities, but are part of the pixel array.

Further, for cases as shown in FIGS. 15B to 15D where functionalities are separated between the pixels 51 of the different subsets, it is possible to assign pixel row numbers (and column numbers) to the event detecting pixels 51b by knowing the "holes" in the APS pixel array into which the event detecting pixels 51b are filled. In particular, address spaces for the EVS pixels can be set up such that row and column numbers are not counted for adjacent event detecting pixels 51a, but according to the overall pixel array.

In principle, the control unit may also assign pixel row numbers to the events based on an analysis of the information captured by the event detecting pixels 51a and the intensity detecting pixels 51b. Since both pixel subsets capture the same scene, it is possible to determine the pixel row and column numbers of the event detecting pixels 51a (and of the respective detected events) by spatially registering both images of the scene and by using the pixel grid defined by the intensity detecting pixels 51b also for the image generated from the event detecting pixels 51a.

In this manner it is also possible to spatially register events of an EVS camera to pixel rows of a separate APS camera as illustrated in FIG. 15E. Here, it is first necessary to spatially register the outputs of both cameras as is known for conventional stereo camera, i.e. by using intrinsic and extrinsic parameters. In this process, it will only be possible to register each event with an epipolar line in the APS image due to the in principle unknown scene depth.

As indicated by arrows A and B in FIG. 15E a single point in the EVS image (A) can only be mapped to an epipolar line in the APS (B). However, if both cameras are placed horizontally, which is the usual setup, the epipolar lines in the APS image will be parallel to the pixel rows. In this manner it is possible to assign pixel row numbers to the events by identifying the corresponding epipolar lines. For cameras that are arranged with parallel pixel rows this allows the control unit 40 to correlate time stamps of the pixel signals with event time stamps by using epipolar lines on the camera having the intensity detecting pixels 51b.

Further, the control unit 40 assigns event time stamps to the detected events based on the time at which the events were detected. Here, the same clock is used to assign the pixel row dependent time stamps to the pixel signals and the event time stamps to the detected events. That is, the sensor device 10 is capable to provide each piece of data with time information according to a single clock. However, since the time stamps of the pixel signals depend on the pixel row number, one cannot simply assign all events, which were detected across all event detecting pixels 51a and which have the same event time stamp, to the pixel signals generated at a time corresponding to the event time stamp. This will group together data belonging to different parts of the scene.

Instead, it is necessary to register the detected events with those pixel signals that have been captured at the same time and which refer to the same part of the captured scene. Moreover, since most applications, like e.g. image signal processor preprocessing, neuronal networks, post processing and the like operate on global shutter data, i.e. on frames having only a single time stamp for all pixels contained therein, it is advantageous to also convert the rolling shutter APS pixel signals to a global shutter representation.

To this end, a conversion function that depends on the pixel row number is used by the control unit 40 to convert the time stamps of all pixel signals to a single frame time, where the pixel signals were obtained during an intensity frame acquisition period that is defined as the time required for a single readout of all pixel rows. Thus, time stamps of all pixel signals of all rows are converted to one time that indicates a capture time of the entire frame in the new, converted time coordinate.

This single frame time allows then to register events in a consistent manner with corresponding pixel signals by converting the event time stamps by the same conversion function to obtain converted event time stamps for the detected events.

This time conversion process is schematically illustrated in the lower part of FIG. 14 for asynchronous event detection, where the control unit 40 is configured to assign to the event data the times at which the events were detected as event time stamps.

As illustrated in FIG. 14, due to the rolling shutter, readout of each row within the pixel array of intensity detecting pixels 51a is retarded with respect to the previous row. In the example of FIG. 14 the temporal shift between the starting points of pixel row readout is always the same, leading to a skew, but linear connection between the starting points in a diagram that shows rows vs. time. It is to be understood that in principle the time periods between the starting times of pixel row readout may differ depending on the pixel row number. The control unit 40 is capable to convert the time coordinate of pixel signal readout, as e.g. the time coordinate of the start of pixel row readout, such that for the new, converted time coordinate all pixel rows have the same starting time.

This is schematically shown at the right side of FIG. 14, where the skew connection line of starting points present for the original time $t_G$ has become a vertical line, indicating a single time in the new time coordinate $t_R$. By applying the conversion function, the time coordinate $t_G$ that would be appropriate for a global shutter data acquisition is thus converted to a time coordinate $t_R$ more appropriate for the rolling shutter data acquisition at hand, since it allows assigning one frame time to the pixel signals acquired by all intensity detecting pixels 51a.

At the bottom left of FIG. 14 a symbolic representation of events detected over time is given. Here, each black rectangle represents an event of positive polarity, i.e. an increase of intensity larger than a threshold, while each white rectangle represents an event of negative polarity, i.e. a decrease of intensity that is larger than a (possible different) threshold. For the sake of simplicity only the distribution of event across pixel rows and time is shown, while the distribution in a column direction (respectively in a direction representing an assignment of the events to the columns of the intensity detecting pixel array) is not shown.

As can be seen from the bottom left diagram of FIG. 14 the address space representation used for asynchronously detected events does not allow correctly assigning detected events to pixel signals in a naïve manner, i.e. by grouping all pixel signals and all events having the same time stamp together. By such a grouping it might, e.g. happen to allocate event data to the wrong row or even to the wrong frame. Instead, it is necessary to take the temporally shifted starting times of acquisition of pixel signal of different rows into account, which is shown by the skew lines in the bottom left diagram of FIG. 14.

This is achieved by converting the event time stamps by the same conversion function as the time stamps of the pixel signals, i.e. by converting "global shutter time $t_G$" to "rolling shutter time $t_R$" for the events in the same manner as for the pixel signals. After conversion it is then possible to gather pixel signal data and event data based on the converted time coordinate $t_R$. In particular, it is possible to assign all events having converted event time stamps within the (converted) frame acquisition period to the respective pixel signal frame. This is indicated in the bottom right diagram of FIG. 14 by the vertical lines that show the length of the frame acquisition period of the pixel signals. All events having converted event time stamps between these lines can be assigned to the respective pixel signal frame.

It is thus possible to provide a set of pixel signal data and event data to further processing stages, as e.g. a neuronal network used for image classification or the like, that contain image information on parts of an observed scene, which information was captured at the same time.

In the example of FIG. 14 (and also below) it is assumed that the predetermined time period separating the starting times of readout of adjacent pixel rows has a value of k that is constant between each of the single pixel rows. An appropriate conversion function to set all starting times that differ in the coordinate system $t_G$ to the same time in the coordinate system $t_R$ will then depend as follows on the pixel row number y:

$$t_R(y) = t_G - k \cdot y.$$

Thus, due to the linear shift by k per row, a linear conversion function can be used that compensates this shift per row.

Of course, it is also possible to allow different shifts $k_i$ for different rows i. In this case the conversion function may take the form $$t_R(y) = t_G - \Sigma_{i=1}^{y} k_i.$$

Further, the shifts k, may in principle also be adjustable dynamically, i.e. they may depend on $t_G$.

In the example of FIG. 14 the APS or intensity detecting pixels 51b are readout by a rolling shutter, while the event detecting pixels 51a are readout asynchronously. In this case temporal registering can be achieved relatively easily by merely transforming pixel signal time stamps and event time stamps.

Further difficulties arise, if events are read out in a frame based manner as e.g. described above with respect to FIG. 8. In this case the event detection circuitry 20 is configured to generate as event data sets of all events detected during consecutive event frame periods. The control unit 40 will then assign to each of the events of said sets e.g. the start or end time of the respective event frame period as the event time stamp as well as a polarity value (or a sum of these values) indicating whether an increase or a decrease of light intensity has been detected.

To register these frame based event data with the pixel signals, the control unit 40 generates a plurality of event frames at predetermined converted time points by interpolating polarity values of events of said sets that have converted event time stamps that are closest to the predetermined converted time points. This means, besides converting the event time stamps of the event frames, an interpolation to certain converted time points is performed, in order to obtain event data that is temporally ordered in the same manner as the converted pixel signal data.

A schematic illustration of this process is provided in FIG. 16. Here, the upper part of FIG. 16 shows the conversion of pixel signal time coordinates, which is equivalent to the discussion of FIG. 14.

The lower part shows steps a) to c) of the registration process of the event data together with an optional step d) referring to the generation of a voxel grid which will be discussed below with respect to FIG. 18.

As shown in step a) sets of event data are generated at fixed times within coordinate system $t_G$, i.e. events are output in a frame based manner as discussed above with respect to FIG. 8. Here, it is to be understood that each event frame extends not only in the row direction, but also in the column direction, just as discussed above with respect to FIG. 14. As discussed above with respect to FIG. 8 the event frame may have entries of the polarities of the events detected latest by the respective event detecting pixels 51a. However, the event frame may also indicate the sum or average of the polarities of events detected within the (or a part of the) event frame period.

Thus, while the APS data of one image frame are temporally shifted by row number, the EVS data are all grouped to event frames to which a single event time stamp is assigned. Again the problem arises that by just combining event frames with the pixel signals having the same time stamp, event data will be provided that have no spatial relation with the respective pixel signals.

On the other hand, by simply converting the event frames by the conversion function as illustrated by step b) in FIG. 16, each row of the event frames will have a different, converted event time stamp. But what is necessary is a representation of the event data in which the event data are grouped into event frames at certain predetermined times according to the converted time coordinate $t_R$, just as it was the case for the unconverted time coordinate $t_G$.

To this end, predetermined, but in principle arbitrary, converted time points are selected by the control unit 40, as e.g. indicated by line C in step b). Event frame values having a converted time stamp that equals one of the predetermined converted time points are maintained. All other values are interpolated by e.g. using event frame values with converted event time stamps neighboring the respective predetermined converted time point.

Figure 17:
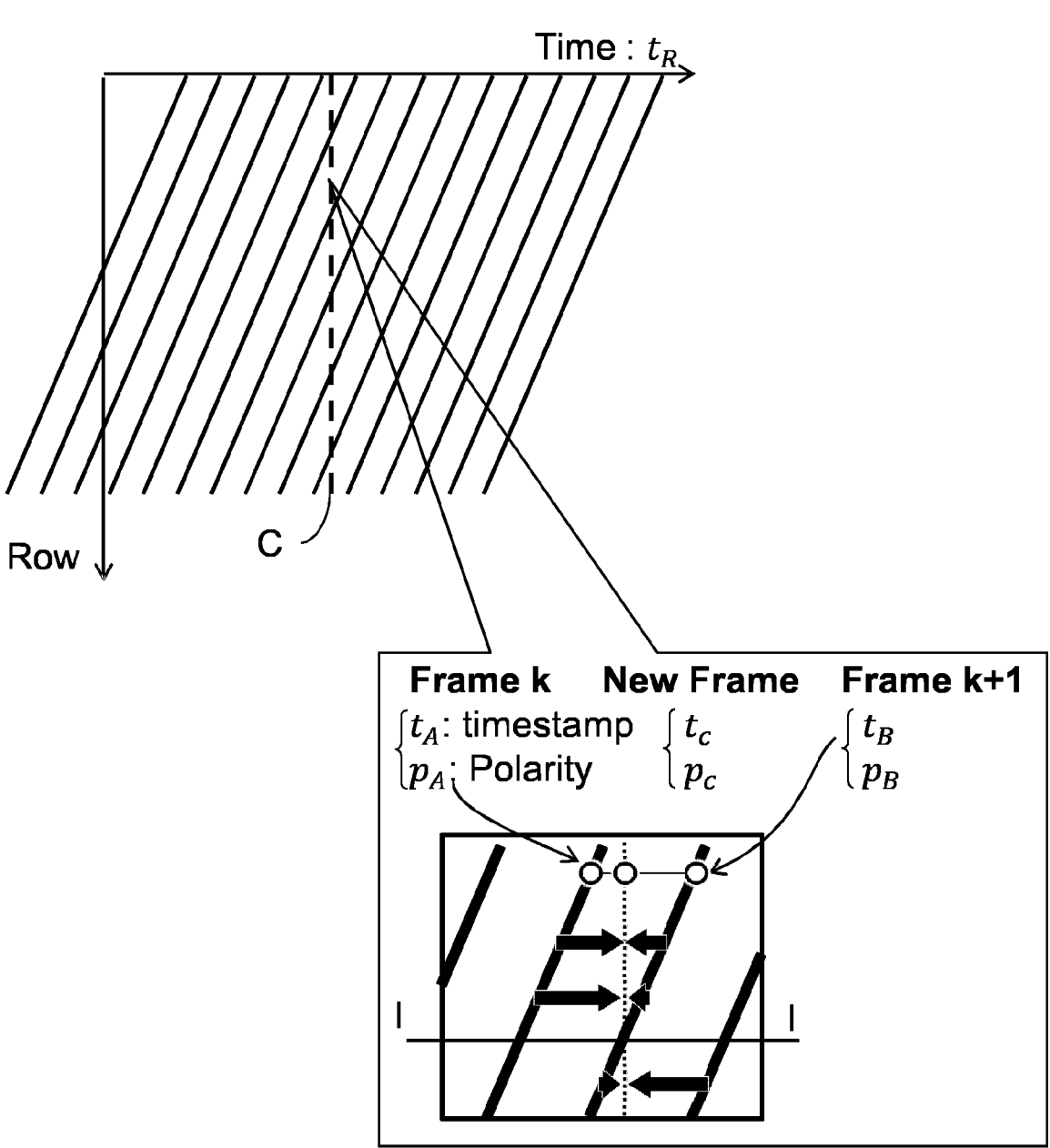
FIG. 17 illustrates schematically generation of time interpolated event frames.

A particular example for such an interpolation is shown in FIG. 17. As indicated in the enlarged portion of FIG. 17, the predetermined converted time point may be $t_c$. For each "pixel" of the new event frame a polarity value $p_c$ is searched for. This value $p_c$ is fixed by finding the two temporally closest corresponding polarity values within the converted event frames k and k+1 between which the new event frame is located. These will have timestamps $t_A$ and $t_B$ and polarity values $p_A$ and $p_B$, respectively.

The value of $p_c$ can then be obtained by interpolation, e.g. by bilinear interpolation based on the temporal distances of the converted event frames to the new event frame:

$$p_c = \frac{(t_B - t_C)p_A + (t_C - t_A)p_B}{t_B - t_A}$$

In this manner all polarity values of the new event frame can be generated.

Here, it should be noted as indicated by the line I-I in FIG. 17 that due to the temporal shift between rows of the converted event frames, the time stamps of the polarity values will pass through the predetermined converted time point $t_c$ with increasing pixel row number. After passing, the two closest polarity values will stem from converted event frames k+1 and k+2. In this manner it is guaranteed that the new event frame will represent polarity information that has been obtained as close as possible to the predetermined converted time point selected for generation of the new event frame.

Thus, a series of new event frames can be generated that each contain only polarity values to which one converted event time stamp per new event frame is assigned as shown in step c) in FIG. 16. It is then possible to correctly assign all polarity values of these event frames to the pixel signals by matching the converted event time stamps and the converted pixel signal time stamps.

It should be noted that although the temporal locations of the new event frames can be freely set, it is advantageous to set their temporal distances such as to obtain the same or a similar frame rate as was the case for the event frames in the unconverted time coordinate $t_G$. Then, the interpolated polarity values will give a most accurate representation of the actually detected polarities/events.

Further, also other interpolation methods may be used that may e.g. also take into account more than the two neighboring polarity values. For example, bi-cubic interpolation may be used, in which four neighboring points determine the interpolated polarity value.

In the example of FIG. 16 event frames have been discussed that are generated as if captured by using a global shutter. However, also the event frames may be generated according a rolling shutter concept, i.e. by using different event time stamps for polarity values in different rows. However, also in this situation the above method can be applied. First, the event time stamps are converted with the same conversion function as the pixel signal time stamps. If by chance this is sufficient to produce temporally unique event frames, no further interpolation step is necessary.

But usually temporal shifts in the pixel signal rolling shutter and the event/polarity detecting rolling shutter are different. In this situation the control unit 40 will carry out an interpolation to obtain new event frames with a unique location in the converted time coordinate $t_R$ just as described above. Accordingly also rolling shutter EVS data can be registered with rolling shutter APS data.

To further simplify temporal registration and to ease further processing of pixel signal data and event data the control unit 40 may generate based on the converted event time stamps an event voxel grid that separates events with converted event time stamps along surfaces of constant converted time. This is schematically illustrated in step d) in FIG. 16 that shows that the new event frames that were generated by interpolation are converted to a voxel grid that concentrates polarity information at certain times. This reduces the processing burden, since it will not be necessary to operate on all event frames which are generated typically with a frame rate up to 10,000 frames per second. This is in particular the case, if the temporal distribution of information is reduced to the range of pixel signal frame rates which amounts to only about 30 frames per second.

Figure 18:
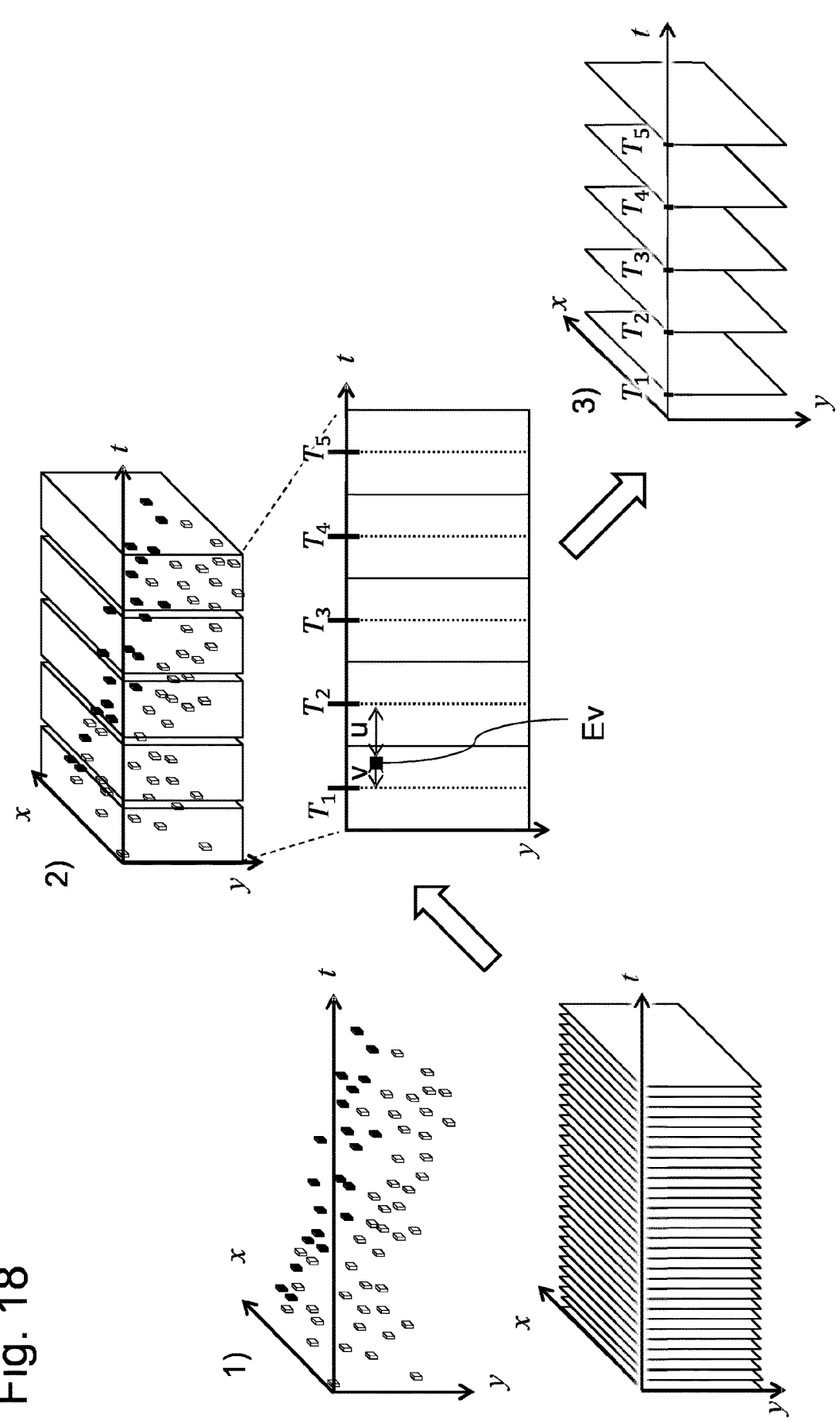
FIG. 18 illustrates schematically generation of a voxel grid.

The generation of an event voxel grid is exemplarily recapitulated with respect to FIG. 18. An event voxel grid may be formed from events grouped into event frames, but may also be generated based on an address space representation of asynchronously generated events, as illustrated in step 1) of FIG. 18.

In each case, a new segmentation/grouping of events is performed to obtain a thinned out event data representation with data only concentrated at specific time points. This is illustrated in steps 2) and 3) of FIG. 18 based on asynchronously generated events, but works according to the same principles also for event frames.

As shown in step 2) the space time volume generated by row, column and time coordinates is separated into space cells or voxels, by choosing, in principle arbitrary, planes at fixed time. In the shown example planes at times $T_1$ with i=1, . . . , 5 are chosen. All the events in one such voxel are used to determine generalized polarity values at corresponding spatial positions on the planes at $T_1$.

For example, polarity values can be summed or averaged and thus projected onto the following plane to generate an event frame at the according time $T_1$. According to a more sophisticated method indicated in the lower part of step 2) of FIG. 18 bilinear interpolation can be used to project polarity values to the boundaries of the corresponding voxel. In this example, the input event Ev has polarity 1, which is split according to the event's temporal distance to the two bounding voxel planes, e.g. according to a distance ratio of u:v (normalized to u+v=1) to v for the plane at $T_1$ and u for the plane at $T_2$, where u is the temporal distance of the event Ev to the plane at $T_1$ and v is the temporal distance to the plane at $T_2$. All pixel values at all planes will be initiated with values of 0 to which the projected polarities are added according to the above interpolation rule. In this manner a comparably sparse event frame representation can be obtained that resembles the overall changes in intensity that did occur between the single frame times $T_i$. For example, voxel grid boundaries could be fixed such as to match the frame rate of pixel signal frames. Of course, any other algorithm for polarity assignment can be used.

In the example of FIG. 16 an event voxel grid is generated as a final step after temporal conversion and interpolation of polarity values. Just the same, the voxel grid may be implemented already after temporal correlation as part of the interpolation of polarity values.

Moreover, the process may also be inverted by generating the event voxel grid before conversion of the time coordinate.

As illustrated in FIG. 19 the control unit 40 may generate the evet voxel grid based on the unconverted event time stamps by separating events with unconverted event time stamps along surfaces of constant converted time. The conversion function is then applied to the thus generated event voxel grid.

To this end, the algorithm explained above with respect to FIG. 18 needs to be modified such that boundaries of the voxels are no longer planes at a fixed unconverted time, but planes that have a fixed converted time, i.e. that are skew in the unconverted time coordinate system $t_G$. This is illustrated schematically in the lower middle diagram of FIG. 19. Projection on these skew planes can then be performed as described above, i.e. by summing, averaging, interpolating or the like of polarity values. The thus generated event voxel grid shown in the lower right of FIG. 19 will consist of skew event frames. However, since planes with constant converted time have been used, these skew event frames will directly convert to fixed time event frames after applying the conversion function, just the same as it will be the case for the skew temporal planes bordering the temporal representation of intensity detecting pixel readout, which are illustrated in the upper right part of FIG. 19.

Thus, conversion of the time coordinate of the pixel signals as discussed with respect to FIG. 14 will automatically also convert the event voxel grid representation into a series of event frames that have each a single time stamp.

Accordingly, also in this manner a correct combination of event data and pixel signal data can be achieved. Of course, although illustrated with respect to global shutter event frames, usage of voxel grids having boundaries at constant converted time points can also be applied to rolling shutter event frames or asynchronously detected events.

FIG. 20 shows a schematic process flow of a method for operating a sensor device 10 that summarized the methods described above.

At S101 light is received and photoelectric conversion with a plurality of pixels 51 of the sensor device 10 is performed to generate an electrical signal.

Event data is generated at S102 by event detection circuitry 20 of the sensor device 10, by detecting as events intensity changes above a predetermined threshold of the light received by each of event detecting pixels 51*a* that form a first subset of the pixels 51.

Pixel signals are generated at S103 by signal generating circuitry 30, the pixel signals indicating intensity values of the light received by each of intensity detecting pixels 51*b* that form a second subset of the pixels 51, the intensity detecting pixels 51*b* being arranged in a two dimensional array comprising a plurality of pixel rows.

At S104 the pixel signals are read out by applying a rolling shutter that starts readout of the pixel signals of adjacent pixel rows at times separated by a predetermined time period and assigning time stamps to each pixel signal that indicate the time of readout of the corresponding pixel row.

At S105 event detecting pixels 51*a* and intensity detecting pixels 51*b* are associated with each other that have a corresponding field of view in order to assign to each detected event a corresponding pixel row number.

At S106 event time stamps are assigned to the events based on the time at which the events were detected.

At S107 the time stamps of all pixel signals are converted by a conversion function that depends on the pixel row number to a single frame time, where the pixel signals were obtained during an intensity frame acquisition period that is defined as the time required for a single readout of all pixel rows.

At S108 the event time stamps are converted by the same conversion function to obtain converted event time stamps for detected events.

In this manner it is possible to correctly assign event data to intensity data that are obtained with an APS having a rolling shutter, while at the same time converting the intensity data into a time format that can be accessed in the same manner as data obtained by global shutter methods. This eases further processing of the event data and the intensity data, e.g. in a neuronal network, and improves the processing results by avoiding wrong association of event data to intensity data.

The technology according to the above (i.e. the present technology) is applicable to various products. For example, the technology according to the present disclosure may be realized as a device that is installed on any kind of moving bodies, for example, vehicles, electric vehicles, hybrid electric vehicles, motorcycles, bicycles, personal mobilities, airplanes, drones, ships, and robots.

Figure 21:
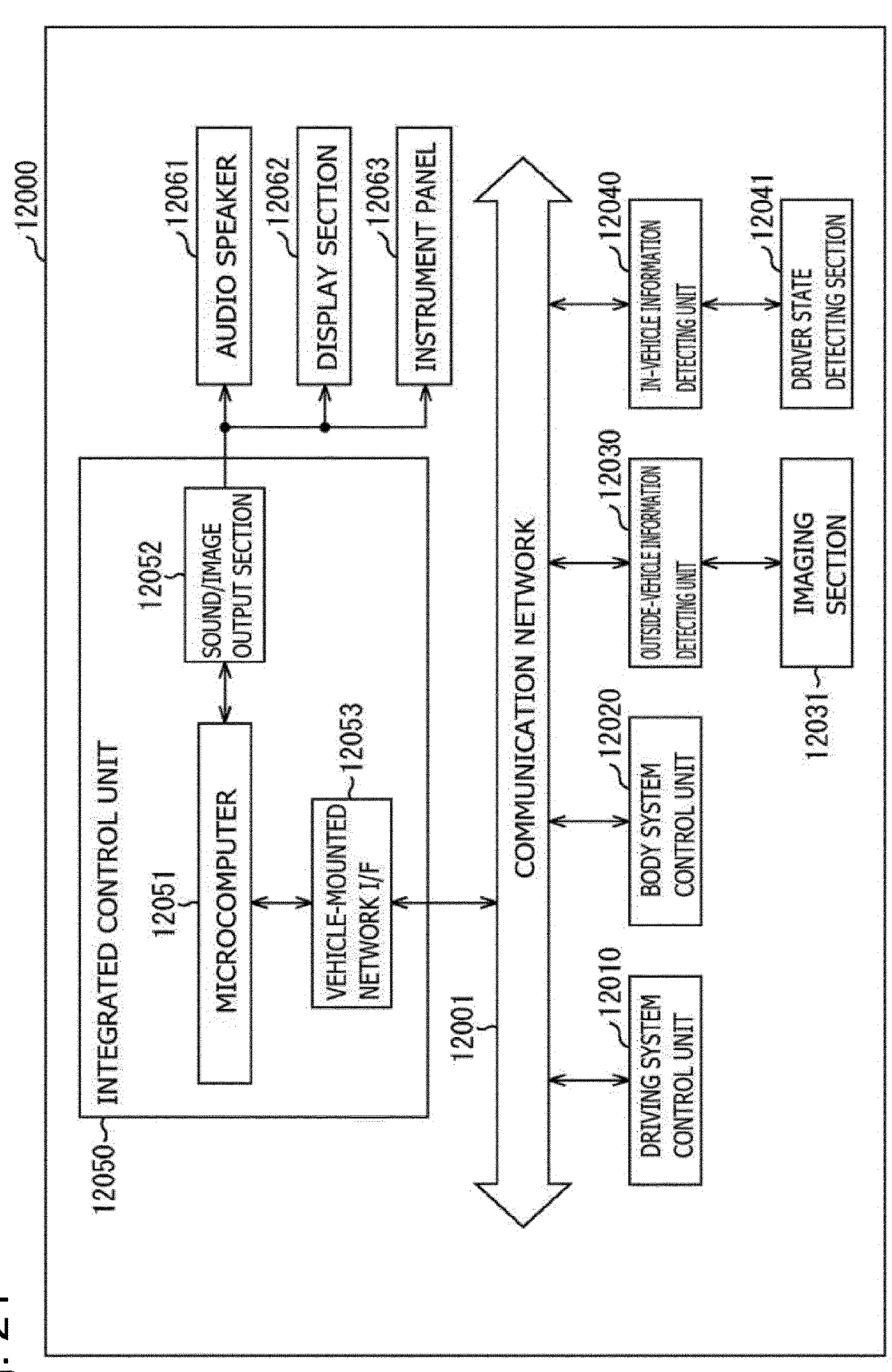
FIG. 21 is a schematic block diagram of a vehicle control system.

FIG. 21 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 21, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 21, an audio speaker 12061, a display section 12062, and an instrument panel 12063 are illustrated as the output device. The display section 12062 may, for example, include at least one of an on-board display and a head-up display.

Figure 22:
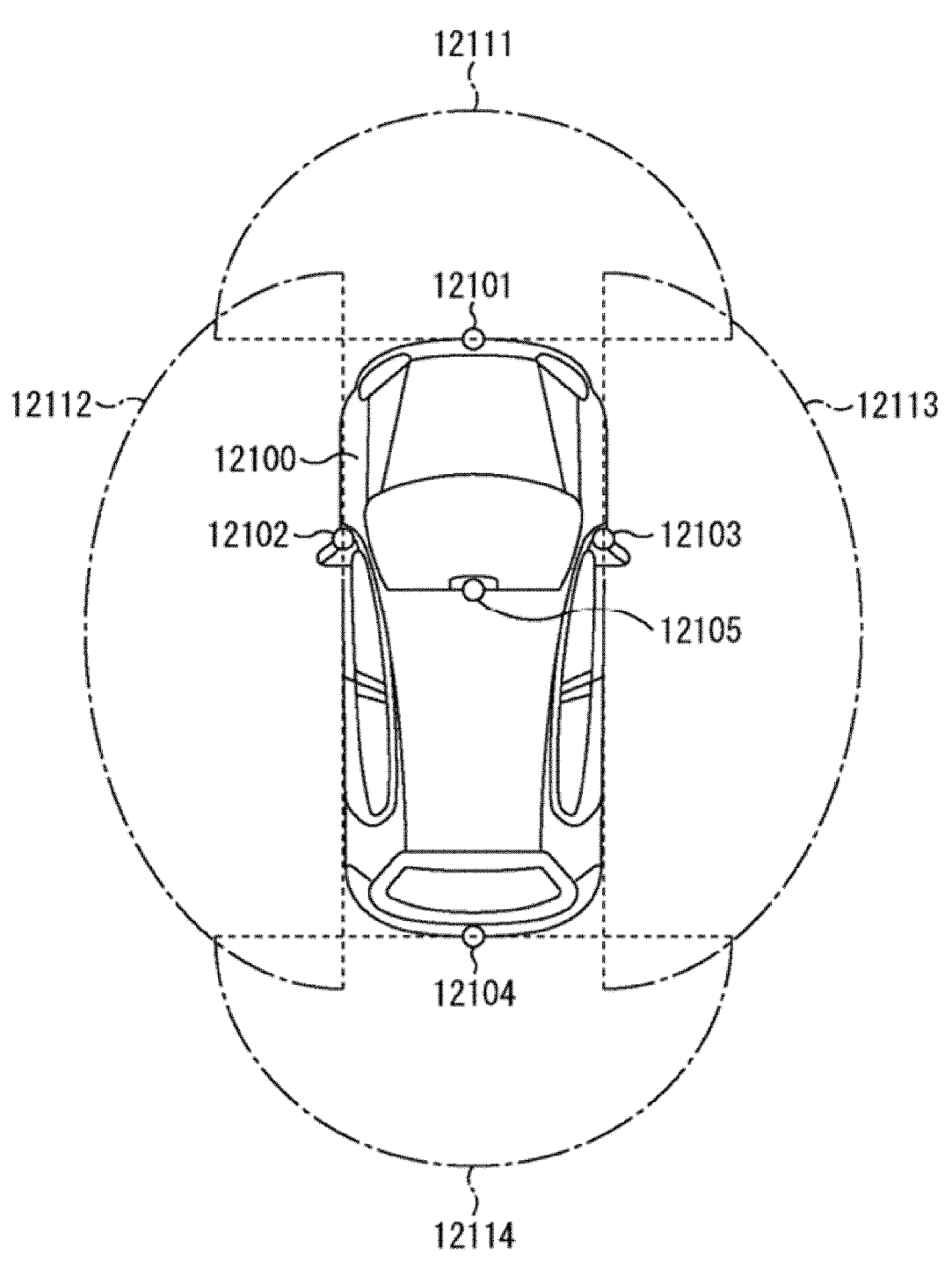
FIG. 22 is a diagram of assistance in explaining an example of installation positions of an outside-vehicle information detecting section and an imaging section.

FIG. 22 is a diagram depicting an example of the installation position of the imaging section 12031.

In FIG. 22, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 22 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of the vehicle control system to which the technology according to the present disclosure is applicable has been described above. The technology according to the present disclosure is applicable to the imaging section 12031 among the above-mentioned configurations. Specifically, the sensor device 10 is applicable to the imaging section 12031. The imaging section 12031 to which the technology according to the present disclosure has been applied flexibly acquires event data and performs data processing on the event data, thereby being capable of providing appropriate driving assistance.

Note that, the embodiments of the present technology are not limited to the above-mentioned embodiment, and various modifications can be made without departing from the gist of the present technology.

Further, the effects described herein are only exemplary and not limited, and other effects may be provided.

Note that, the present technology can also take the following configurations.

1. A sensor device comprising:
a plurality of pixels each configured to receive light and perform photoelectric conversion to generate an electrical signal;
event detection circuitry that is configured to generate event data by detecting as events intensity changes above a predetermined threshold of the light received by each of event detecting pixels that form a first subset of the pixels;

pixel signal generating circuitry that is configured to generate pixel signals indicating intensity values of the light received by each of intensity detecting pixels that form a second subset of the pixels, the intensity detecting pixels being arranged in a two dimensional array comprising a plurality of pixel rows; and
a control unit that is configured
to associate with each other event detecting pixels and intensity detecting pixels that have a corresponding field of view in order to assign to each detected event a corresponding pixel row number;
to read out the pixel signals by applying a rolling shutter that starts readout of the pixel signals of adjacent pixel rows at times separated by a predetermined time period and to assign time stamps to each pixel signal that indicate the time of readout of the corresponding pixel row,
to assign to the events event time stamps based on the time at which the events were detected,
to convert by a conversion function that depends on the pixel row number the time stamps of all pixel signals to a single frame time, where the pixel signals were obtained during an intensity frame acquisition period that is defined as the time required for a single readout of all pixel rows, and
to convert the event time stamps by the same conversion function to obtain converted event time stamps for detected events.
2. The sensor device according to 1, wherein
the predetermined time period separating the starting times of readout of adjacent pixel rows has a value of k; and
the conversion function converts a time $t_G$ into a converted time $t_R$ based on the pixel row number y by setting $$t_R(y) = t_G - k \cdot y.$$

3. The sensor device according to any one of 1 or 2, wherein
the event detection circuitry is configured to detect events in an asynchronous manner; and
the control unit is configured to assign to the event data the times at which the events were detected as the event time stamps.
4. The sensor device according to any one of 1 or 2, wherein
the event detection circuitry is configured to generate as event data sets of all events detected during consecutive event frame periods; and
the control unit is configured
to assign to each of the events of said sets the end time of the respective event frame period as the event time stamp as well as a polarity value indicating whether an increase or a decrease of light intensity has been detected, and
to generate a plurality of event frames at predetermined converted time points by interpolating polarity values of events of said sets that have converted event time stamps that neighbor the predetermined converted time points.
5. The sensor device according to 4, wherein
the control unit is configured to assign to each event detecting pixel a polarity value indicating the occurrences of events within said event frame period together with the event time stamp indicating the end time of said event frame period; and interpolation to a given predetermined converted time point is performed by looking for each event detecting pixel for the two polarity values that are associated with the converted event time stamps that are closest to the given predetermined converted time point, and by interpolating said two polarity values to the given predetermined converted time point.

6. The sensor device according to any one of 1 to 5, wherein the control unit is configured to generate based on the converted event time stamps an event voxel grid that separates events with converted event time stamps along surfaces of constant converted time.

7. The sensor device according to any one of 1 to 3, wherein the control unit is configured to generate based on the event time stamps an event voxel grid by separating events with unconverted event time stamps along surfaces of constant converted time, and to convert time information of the thus generated event voxel grid by the conversion function.

8. The sensor device according to any of 1 to 7, wherein the first subset of pixels overlaps or is equal to the second subset of pixels; and the control unit is configured to assign pixel row numbers to events based on pixels that function as event detecting pixels as well as intensity detecting pixels.

9. The sensor device according to any of 1 to 7, wherein the event detecting pixels and the intensity detecting pixels are different from each other;

generation of event data and generation of pixel signals is synchronized; and the control unit is configured to assign pixel row numbers to the events based on an analysis of the information captured by the event detecting pixels and the intensity detecting pixels.

10. The sensor device according to 9, wherein the event detecting pixels and the intensity detecting pixels are located on different sensor chips or in different cameras of the sensor device.

11. The sensor device according to 10, wherein the different cameras are arranged with parallel pixel rows; and the control unit is configured to correlate time stamps of the pixel signals with event time stamps by using epipolar lines on the camera having the intensity detecting pixels.

12. A method for operating a sensor device, the method comprising:

receiving light and performing photoelectric conversion with a plurality of pixels of the sensor device to generate an electrical signal;

generating, by event detection circuitry of the sensor device, event data by detecting as events intensity changes above a predetermined threshold of the light received by each of event detecting pixels that form a first subset of the pixels;

generating, by signal generating circuitry, pixel signals indicating intensity values of the light received by each of intensity detecting pixels that form a second subset of the pixels, the intensity detecting pixels being arranged in a two dimensional array comprising a plurality of pixel rows;

reading out the pixel signals by applying a rolling shutter that starts readout of the pixel signals of adjacent pixel rows at times separated by a predetermined time period and assigning time stamps to each pixel signal that indicate the time of readout of the corresponding pixel row;

associating with each other event detecting pixels and intensity detecting pixels that have a corresponding field of view in order to assign to each detected event a corresponding pixel row number;

assigning to the events event time stamps based on the time at which the events were detected;

converting by a conversion function that depends on the pixel row number the time stamps of all pixel signals to a single frame time, where the pixel signals were obtained during an intensity frame acquisition period that is defined as the time required for a single readout of all pixel rows; and converting the event time stamps by the same conversion function to obtain converted event time stamps for detected events.

The invention claimed is:

1. A sensor device comprising:

a plurality of pixels each configured to receive light and perform photoelectric conversion to generate an electrical signal;

event detection circuitry that is configured to generate event data by detecting as events intensity changes above a predetermined threshold of the light received by each of event detecting pixels that form a first subset of the pixels;

pixel signal generating circuitry that is configured to generate pixel signals indicating intensity values of the light received by each of intensity detecting pixels that form a second subset of the pixels, the intensity detecting pixels being arranged in a two dimensional array comprising a plurality of pixel rows; and a control unit that is configured to associate with each other event detecting pixels and intensity detecting pixels that have a corresponding field of view in order to assign to each detected event a corresponding pixel row number;

to read out the pixel signals by applying a rolling shutter that starts readout of the pixel signals of adjacent pixel rows at times separated by a predetermined time period and to assign time stamps to each pixel signal that indicate the time of readout of the corresponding pixel row, to assign to the events event time stamps based on the time at which the events were detected, to convert by a conversion function that depends on the pixel row number the time stamps of all pixel signals to a single frame time, where the pixel signals were obtained during an intensity frame acquisition period that is defined as the time required for a single readout of all pixel rows, and to convert the event time stamps by the same conversion function to obtain converted event time stamps for detected events.

2. The sensor device according to claim 1, wherein the predetermined time period separating the starting times of readout of adjacent pixel rows has a value of $k$; and the conversion function converts a time to into a converted time $t_R$ based on the pixel row number y by setting $$t_R(y) = t_G - k \cdot y.$$

3. The sensor device according to claim 1, wherein
the event detection circuitry is configured to detect events in an asynchronous manner; and
the control unit is configured to assign to the event data the times at which the events were detected as the event time stamps.

4. The sensor device according to claim 1, wherein
the event detection circuitry is configured to generate as event data sets of all events detected during consecutive event frame periods; and
the control unit is configured
  to assign to each of the events of said sets the end time of the respective event frame period as the event time stamp as well as a polarity value indicating whether an increase or a decrease of light intensity has been detected,
  to generate a plurality of event frames at predetermined converted time points by interpolating polarity values of events of said sets that have converted event time stamps that neighbor the predetermined converted time points.

5. The sensor device according to claim 4, wherein
the control unit is configured to assign to each event detecting pixel a polarity value indicating the occurrences of events within said event frame period together with the event time stamp indicating the end time of said event frame period; and
interpolation to a given predetermined converted time point is performed by looking for each event detecting pixel for the two polarity values that are associated with the converted event time stamps that are closest to the given predetermined converted time point, and by interpolating said two polarity values to the given predetermined converted time point.

6. The sensor device according to claim 1, wherein
the control unit is configured to generate based on the converted event time stamps an event voxel grid that separates events with converted event time stamps along surfaces of constant converted time.

7. The sensor device according to claim 1, wherein
the control unit is configured to generate based on the event time stamps an event voxel grid by separating events with unconverted event time stamps along surfaces of constant converted time, and to convert time information of the thus generated event voxel grid by the conversion function.

8. The sensor device according to claim 1, wherein
the first subset of pixels overlaps or is equal to the second subset of pixels; and
the control unit is configured to assign pixel row numbers to events based on pixels that function as event detecting pixels as well as intensity detecting pixels.

9. The sensor device according to claim 1, wherein
the event detecting pixels and the intensity detecting pixels are different from each other;
generation of event data and generation of pixel signals is synchronized; and
the control unit is configured to assign pixel row numbers to the events based on an analysis of the information captured by the event detecting pixels and the intensity detecting pixels.

10. The sensor device according to claim 9, wherein
the event detecting pixels and the intensity detecting pixels are located on different sensor chips or in different cameras of the sensor device.

11. The sensor device according to claim 10, wherein
the different cameras are arranged with parallel pixel rows; and
the control unit is configured to correlate time stamps of the pixel signals with event time stamps by using epipolar lines on the camera having the intensity detecting pixels.

12. A method for operating a sensor device, the method comprising:
receiving light and performing photoelectric conversion with a plurality of pixels of the sensor device to generate an electrical signal;
generating, by event detection circuitry of the sensor device, event data by detecting as events intensity changes above a predetermined threshold of the light received by each of event detecting pixels that form a first subset of the pixels;
generating, by signal generating circuitry, pixel signals indicating intensity values of the light received by each of intensity detecting pixels that form a second subset of the pixels, the intensity detecting pixels being arranged in a two dimensional array comprising a plurality of pixel rows;
reading out the pixel signals by applying a rolling shutter that starts readout of the pixel signals of adjacent pixel rows at times separated by a predetermined time period and assigning time stamps to each pixel signal that indicate the time of readout of the corresponding pixel row;
associating with each other event detecting pixels and intensity detecting pixels that have a corresponding field of view in order to assign to each detected event a corresponding pixel row number;
assigning to the events event time stamps based on the time at which the events were detected;
converting by a conversion function that depends on the pixel row number the time stamps of all pixel signals to a single frame time, where the pixel signals were obtained during an intensity frame acquisition period that is defined as the time required for a single readout of all pixel rows; and
converting the event time stamps by the same conversion function to obtain converted event time stamps for detected events.

* * * * *